United States Patent [19]
Riley et al.

[11] 3,817,618
[45] June 18, 1974

[54] MICROFICHE DUPLICATING MEANS

[76] Inventors: Robert E. Riley, 1131 Winn Rose St., Jackson, Miss. 39211; James H. Gabler, 111 E. William David Pky., Metairie, La. 70005

[22] Filed: Apr. 30, 1973

[21] Appl. No.: 355,591

[52] U.S. Cl. ................................. 355/100, 355/97
[51] Int. Cl. .......................................... G03b 27/30
[58] Field of Search ............... 355/100, 106, 97, 28

[56] References Cited
UNITED STATES PATENTS

| | | | |
|---|---|---|---|
| 3,331,276 | 7/1967 | Oliver | 355/100 |
| 3,726,590 | 4/1973 | Kistner et al. | 355/100 |
| 3,740,139 | 6/1973 | Limberger | 355/100 |

*Primary Examiner*—Richard M. Sheer
*Attorney, Agent, or Firm*—Pugh & Laiche

[57] ABSTRACT

The present invention is concerned with a microfiche duplicating device for making vesicular photographic film microfiche copies from a master. The present device provides in combination apparatus for conveying a microfiche master and copy film into an exposure station whereby a vesicular photographic microfiche copy is made of the master; a developer station whereby the image in the vesicular microfiche copy is developed; a film cooling station whereby the vesicular microfiche copy is cooled and decurled; a clearing station for decomposing unused sensitizer in the vesicular microfiche copy; and a copy receiving station.

The present invention is also concerned with a method of making vesicular photographic microfiche copies which are not warped or distorted. The method of the instant invention comprises exposing a master in juxtaposition with vesicular copy film; developing the vesicular copy to produce the image of the master therein; cooling and decurling the vesicular copy; and then clearing the vesicular copy.

4 Claims, 24 Drawing Figures

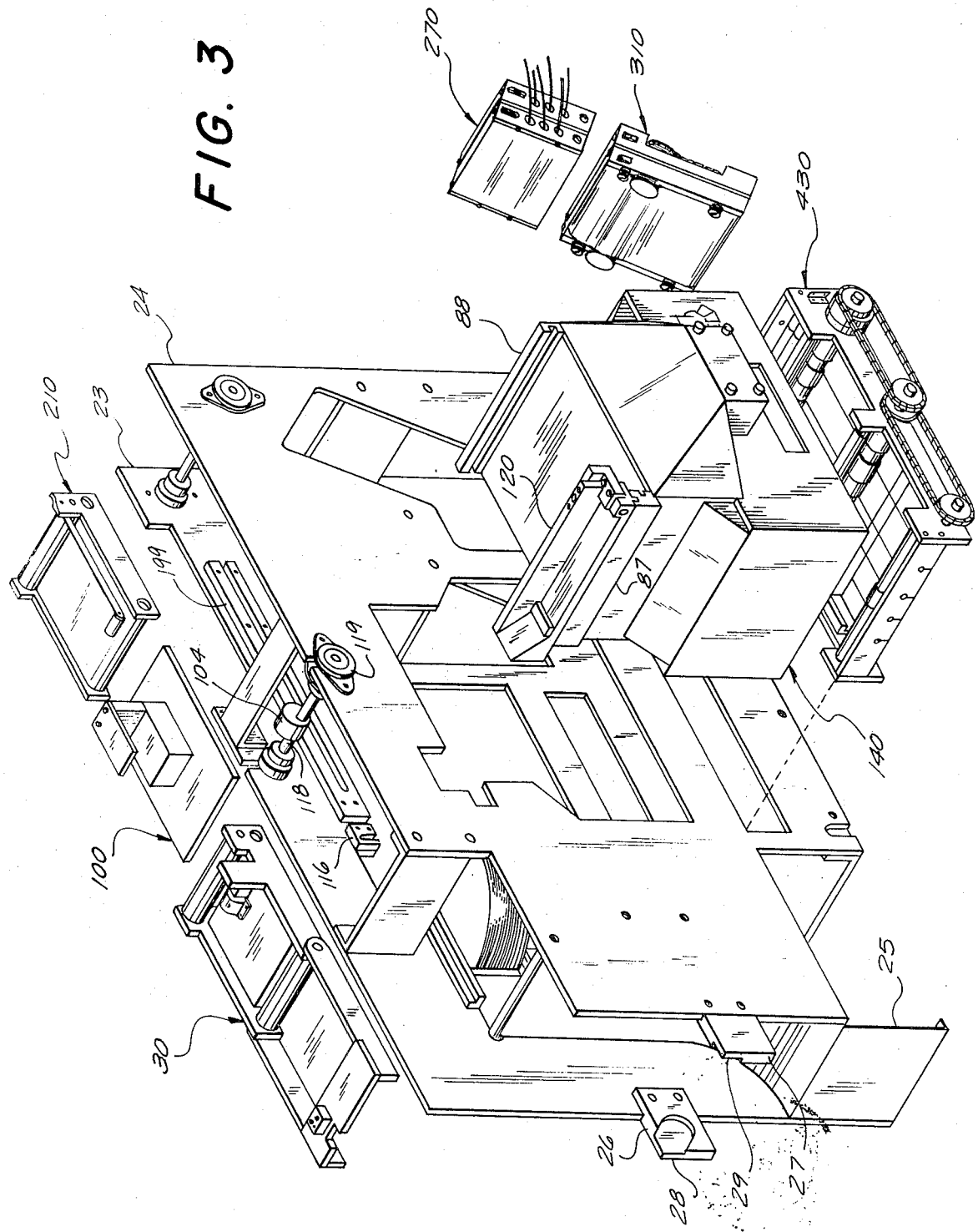

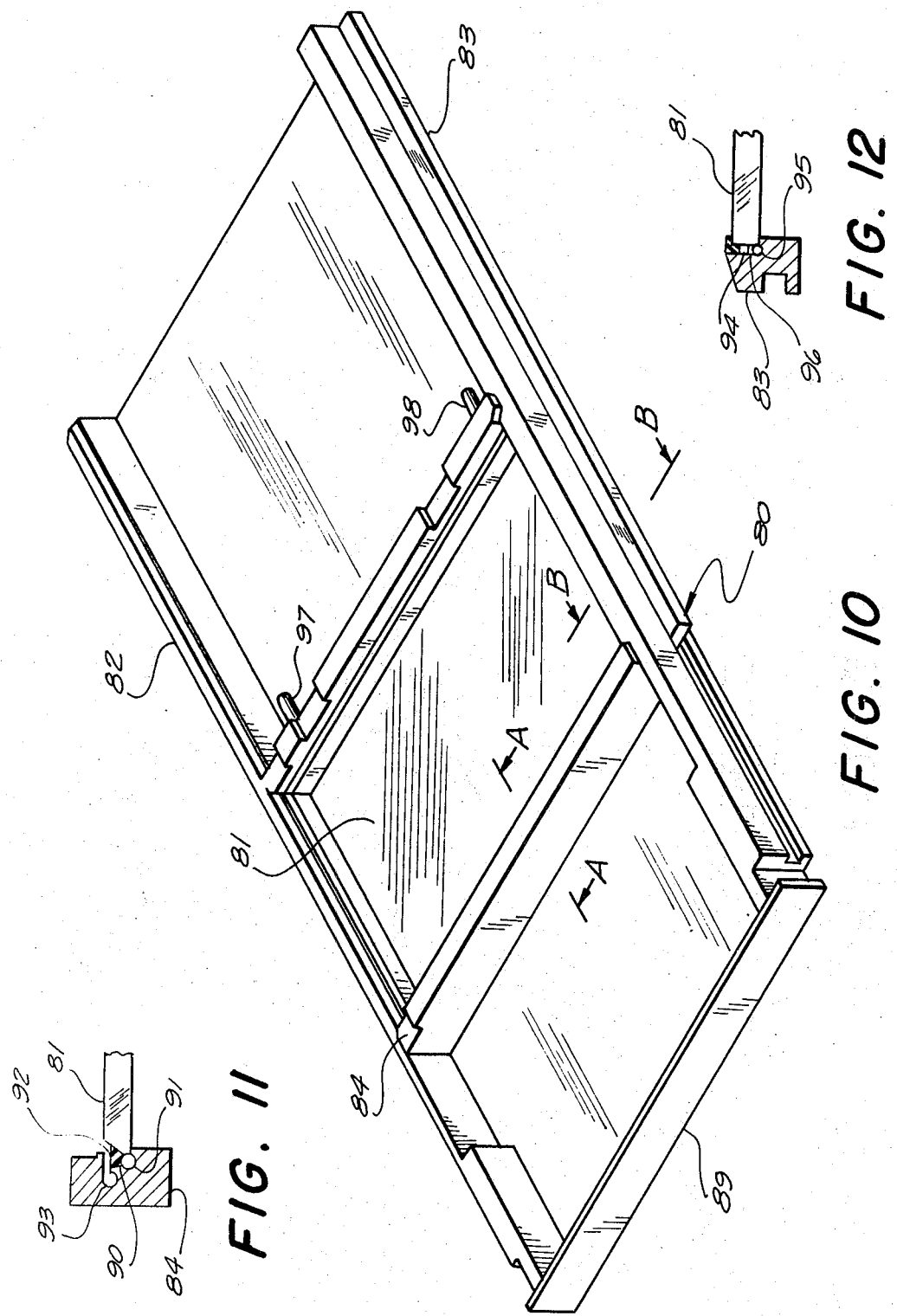

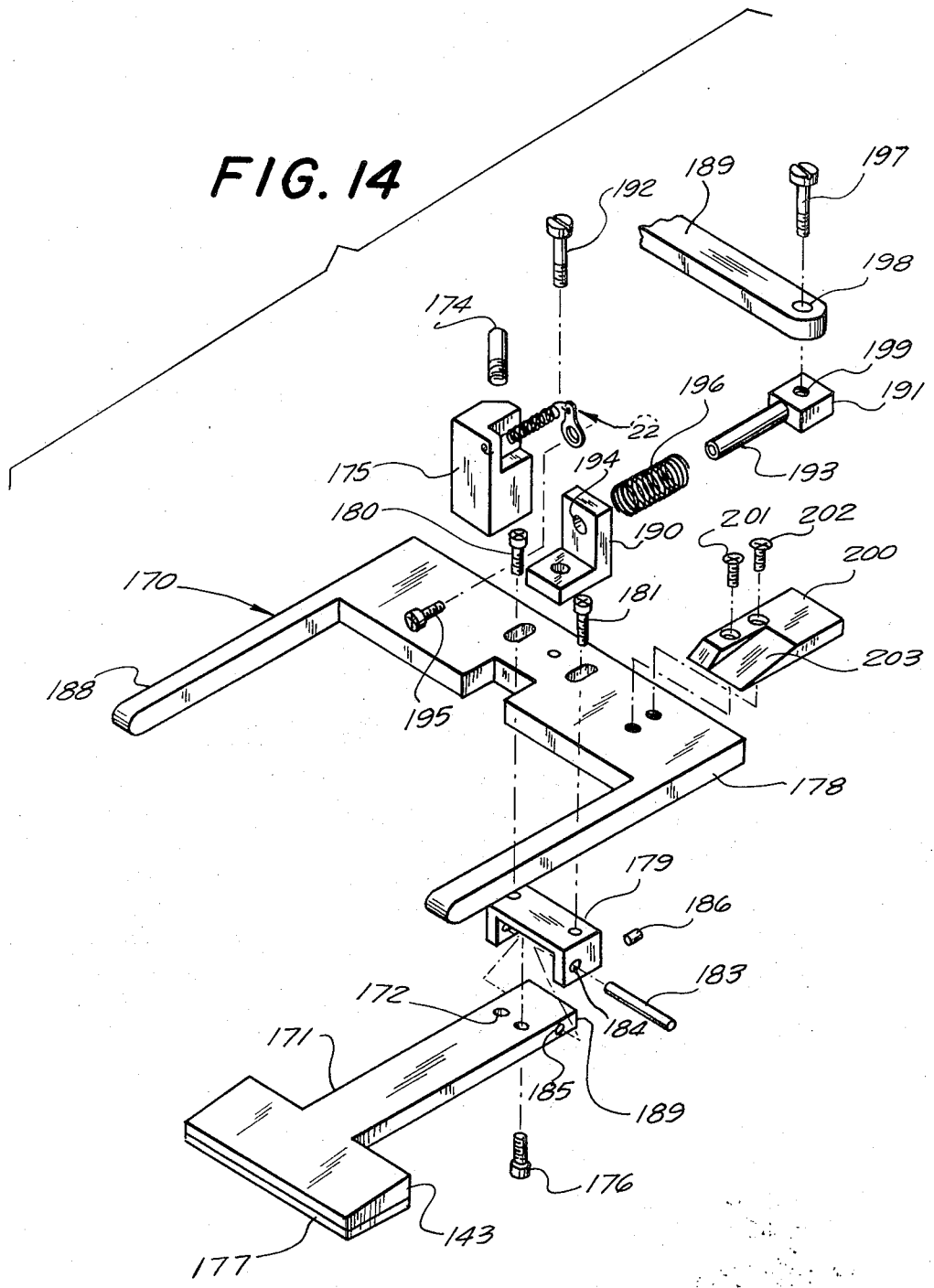

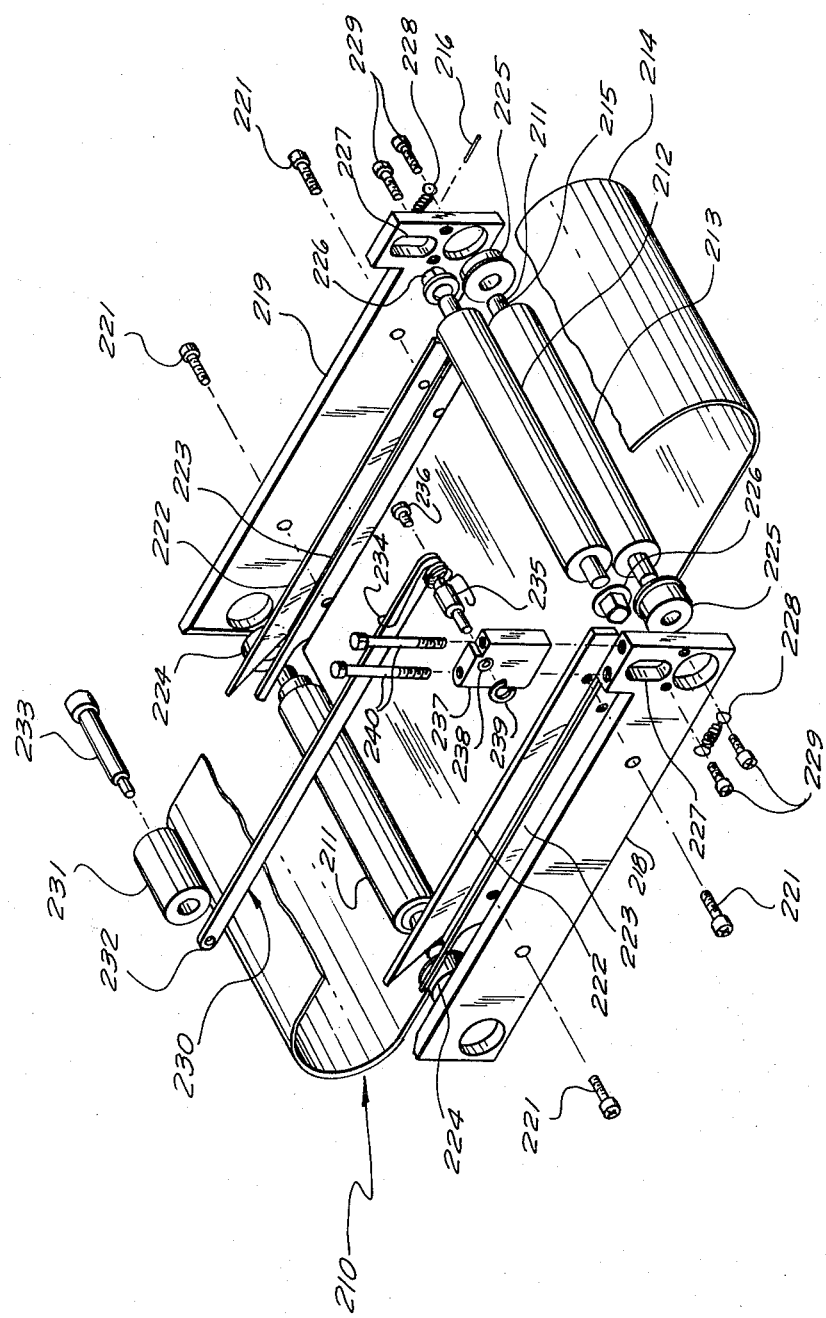

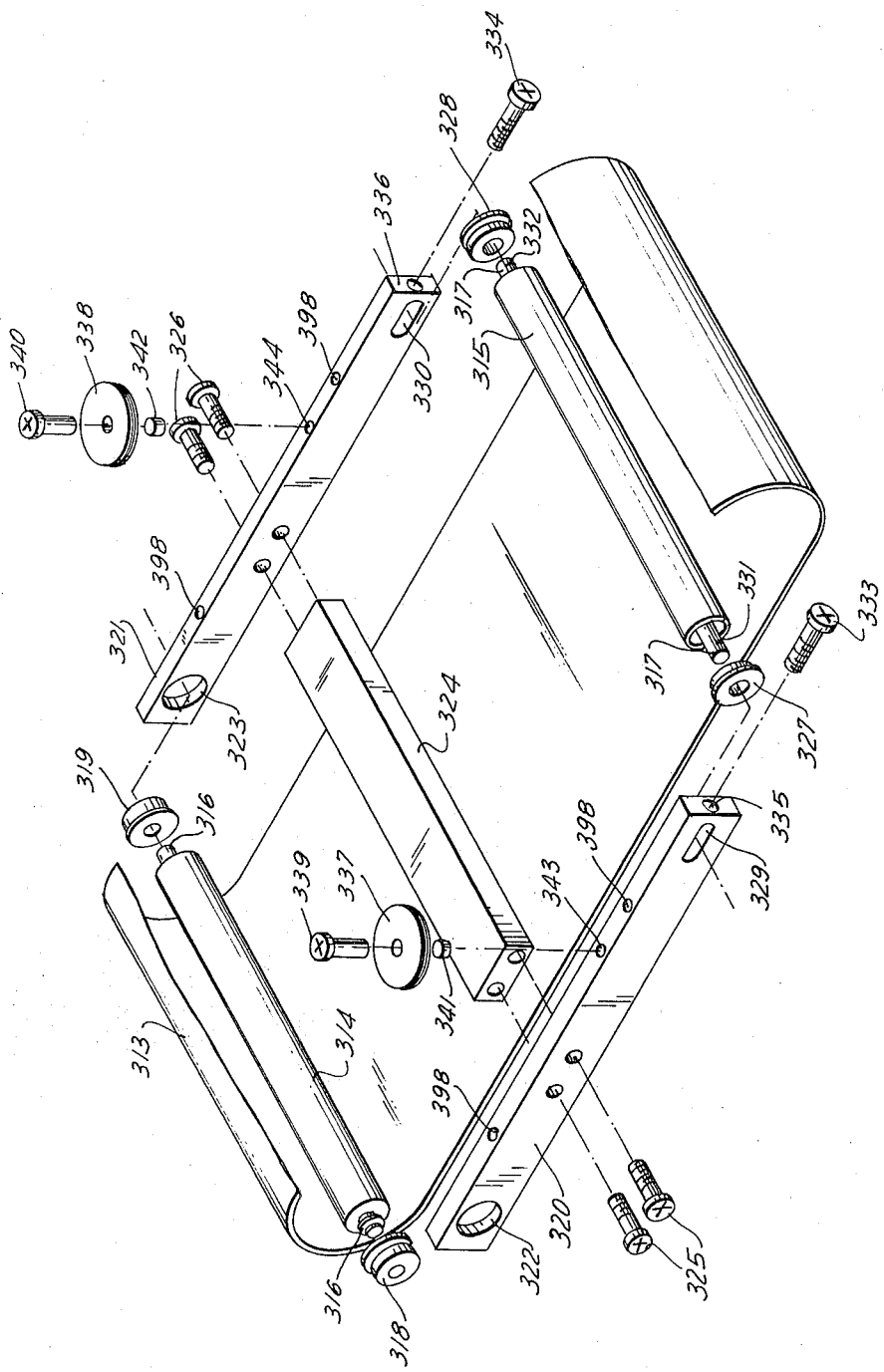

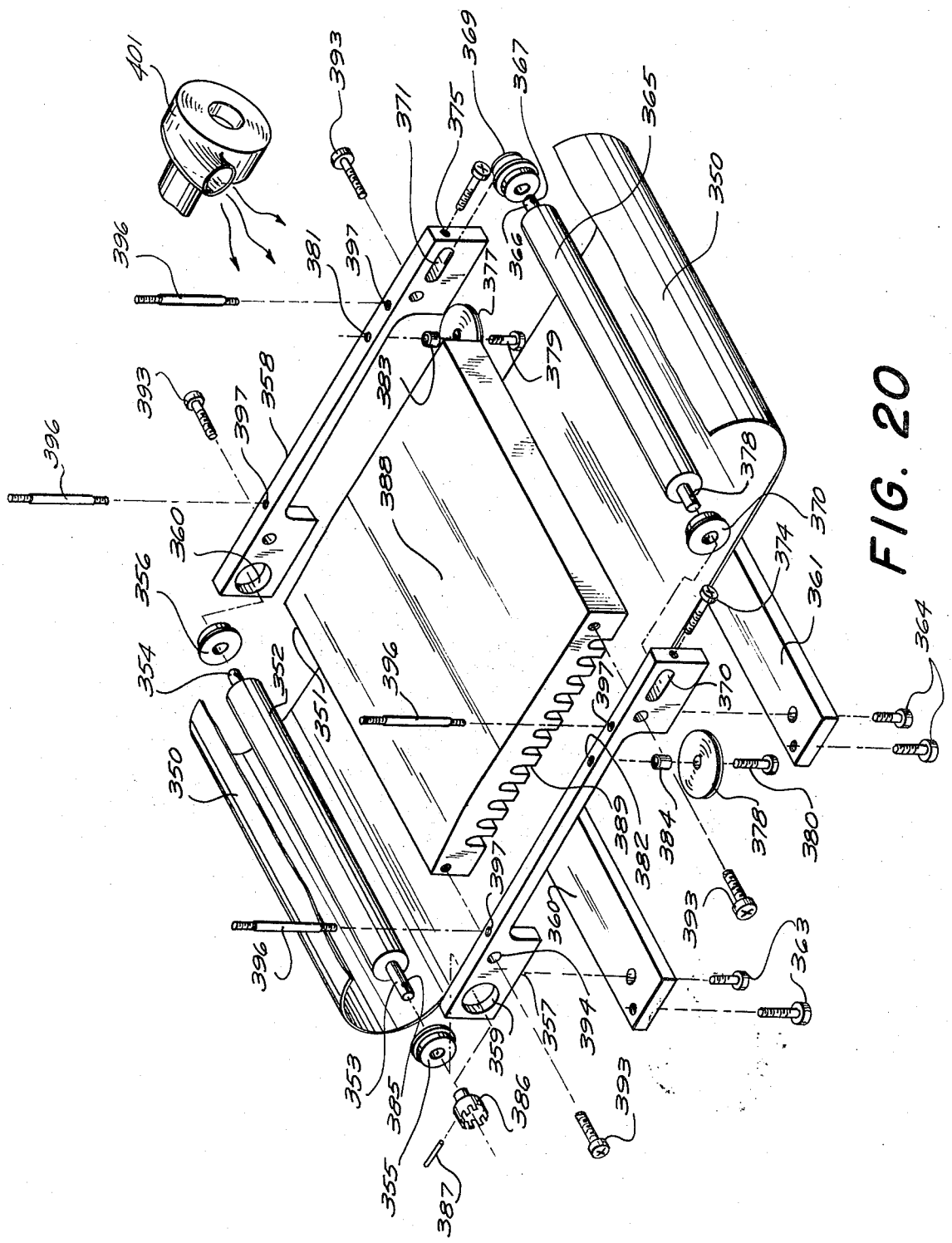

the number 3,817,618

MICROFICHE DUPLICATING MEANS

BACKGROUND OF THE INVENTION

The present invention is concerned with those arts relating to the duplication of what is known as microfiche film utilizing a vesicular photographic film as the copying medium. More specifically, the present invention provides both method and means for rapidly making microfiche vesicular photographic film copies from a microfiche master whereby a physically flat copy is produced.

The term microfiche is generally described in the trade as a new form of microfilm in which a related group of images are arranged on a card shaped transparent sheet of film. Such sheets of film generally measure 4 inches × 6 inches and are handled unmounted. A need exists in the art today for a reliable duplicating machine capable of rapidly making vesicular photographic film copies of microfiche masters.

Commercially employed vesicular film consists of a thermoplastic resin coated upon a transparent support or base material. Within the thermoplastic resin there is uniformly dispersed an ultraviolet-sensitive compound. Upon exposure to ultraviolet radiation, this compound is decomposed to form nitrogen gas. Upon the application of heat, (e.g., passing the exposed vesicular film through the developer station) the decomposition products expand to form microscopic vesicles. These vesicles, since they are of a different index of refraction from the surrounding medium, scatter light incident upon them and thus constitute the image. The final (clearing) stage of processing is accomplished by passing the vesicular film through the clearing station, where it is again exposed to ultraviolet light of high intensity. In this stage, the previously unexposed compounds are decomposed by the light. The gas thus formed slowly diffuses, leaving clear areas on the film.

Heretofore to the present discovery, vesicular photographic film microfiche copies have been made in a two step procedure, utilizing two separate machines. In one machine, the master was exposed in juxtaposition with a vesicular film copy sheet, and subsequently developed in a separate development machine. Needless to say, this operation is time consuming, and hence, is expensive from a manpower viewpoint. Additionally, the quality of microfiche copies so produced is inconsistant, coupled with the fact that the originals become scratched and dirty due to their individual handling. These and other problems inherent in the prior art of making vesicular photographic film microfiche copies are readily overcome by way of the instant invention as will be apparent from the ensuing detailed description.

Among the distinct advantages and features of the present invention is the provision of a desk top machine which produces high quality, roll to sheet, uniform copies of negative or positive original-microfiche. Almost any photographic type and size of master fiche is acceptable, viz., vesicular, silver, diazo or the like. After inserting a single master fiche in the machine and setting the copies desired, the machine cuts the exact length of copy film, exposes it, develops and clears it, and delivers finished physically flat copies up to 900 per hour. No additional steps or operator attendance is required. The present duplicator means combines the simplicity of operation and overall size of an office copier with the duplication speed and quality of larger and more complex machines. Unlike many prior art machines, the present duplicator means and method eliminates noxious fumes and chemical wastes disposal problems, and achieve a viewing negative from a computer output microfilm or other positive or negative master.

DESCRIPTION OF THE PREFERRED EMBODIMENT

Figure 1:
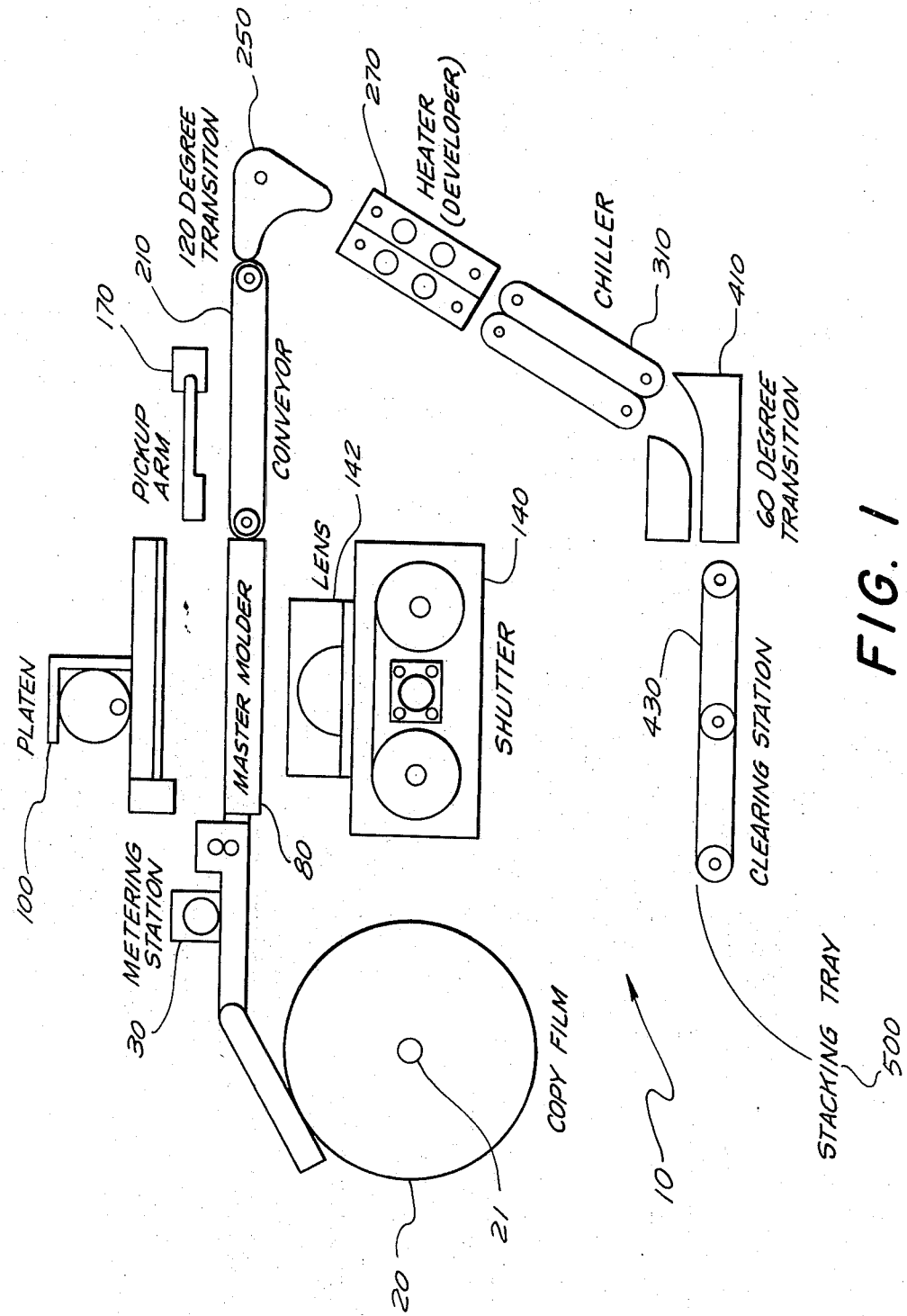

The basic operational sequence of the present duplicator is schematically depicted in FIG. 1 of the drawings. To initiate operation, referring to FIG. 2 of the drawings, the operator presses the on-off switch 11 mounted on the control panel 12 and waits a sufficient length of time for the machine to warm up as indicated by the temperature ready light 13. An exposure setting is meanwhile selected by manipulating the exposure rheostat dial 14 and the number of copies set by positioning the selector dial switch 15. After the machine is up to operating temperature, the copy start switch 16 is depressed whereby the vesicular film is automatically pulled, and metered, from the copy film roll 20 of FIG. 1. The metered film is pushed across the master holder 80 by the metering station 30 until the correct length is sensed. After metering stops, the pressure platen 100 presses the copy film to the master copy, automatically cutting the copy film to the correct length as the platen 100 depresses. With the platen 100 firmly contacting the copy to the master film, the shutter 140 opens whereby light is allowed to pass through the lens 142 thereby exposing the copy through the master for a time determined by the exposure setting 14 on the control panel 12. At the completion of the exposure cycle, the pressure platen 100 lifts up and the pick up arm 178 of the copy retrieval carriage assembly 170 reaches in and down, grabbing the film by means of vacuum. The arm then retracts separating the exposed copy film and the master. The conveyor 210 moves the copy film through the 120 degree transition film guide 240. This transition simply guides the copy film to turn the corner and enter the developing station 270. The developer station 270 applies the necessary heat on both emulsion and base sides to develop the latent image in the vesicular copy film to a visible image. As the copy film exits the developer 280, it immediately enters the chiller/decurler station 310 and thereafter the 60° transition film guide 410 which allows it to turn the corner and enter the clearing station 430. The conveyor speed of the clearing station 430 slows down by a factor of 2.5 the original speed as the copy film flows through the conveyor assembly. This speed change allows copy film to be exposed to the clearing lamp of the clearing station 430 for a longer period of time. The clear copy film is deposited in the stacking tray 500 for removal by the operator.

The above copy cycle is repeated automatically until the number on the control panel indicator 17 matches that number preset into the copy set switch 15 of the control panel 12. The standby switch 18 is provided to let the operator terminate copy mode before the copy counter 15 has reached its set point. When the standby switch 18 is depressed, the copy in progress is completed and film metering is stopped. However, all transport, electronic, developer and lamp systems remain operative. The machine 10 remains in this state until the copy start button 16 is depressed at which time the copy counter 15 will re-set to its indicated number of copies and resume operation.

The structural details of the various components of the present developer means 10 described in the above operational sequence and their structural relationship are shown in FIG. 3 of the drawings. The specific structure of each component of the present duplicator means 10 is described below with reference to the appropriate figure in the drawings in terms of that component's position in the operational sequence as described above.

Figure 2:
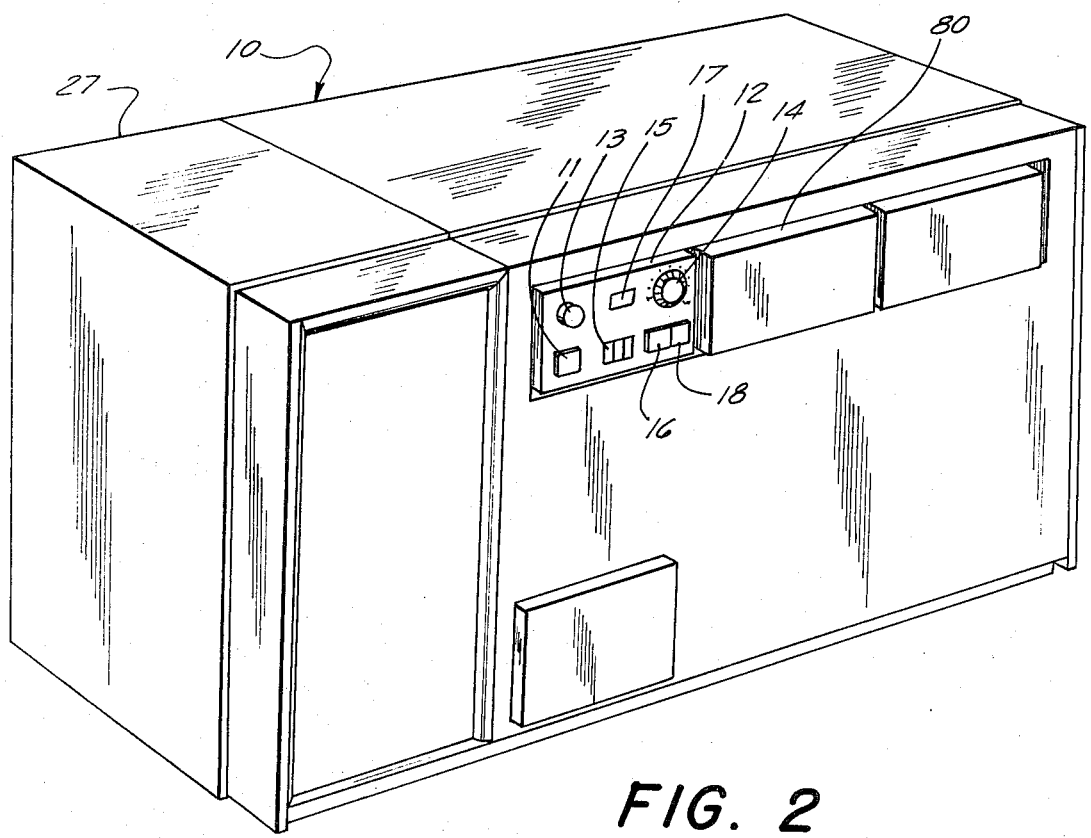

Referring to FIG. 3 in the drawings, the roll of vesicular copy film 20, which can be, for example, 1,000 ft. of 4 or 5 mil base, or 500 ft. of 7 mil base, is inserted on the spindel 21 (FIG. 1) which is adapted to slide through the core of the roll of copy film. The roll 20 is then inserted in the film holding assembly 22 which as shown in FIG. 3 is a concave cavity defined by the side plates 23 and 24, and the partition 25. The spool holders 26 and 27 are provided adjacent the cavity for holding the roll of copy film 20. The spool holders 26 and 27 are provided with the slots 28 and 29 respectively which angle downward from the open end to allow gravity to hold the roll 20 in place. Referring to FIG. 2 of the drawings, access is gained to the compartment 22 by swinging open the door assembly 27 which is hinged at the rear of the unit and magnetically attached to the front of the unit. To change film, the door is simply swung open, the roll of unused film removed, the spindle 21 is slid through the core of the new roll and the spindle 21 inserted into mounting slides 28 and 29. The film is inserted therein so as to exit from the top of the roll and clockwise. The film is then fed to the metering station 30 by feeding the film over the idler roller 31 and under the metering device roller 32.

Figure 4:
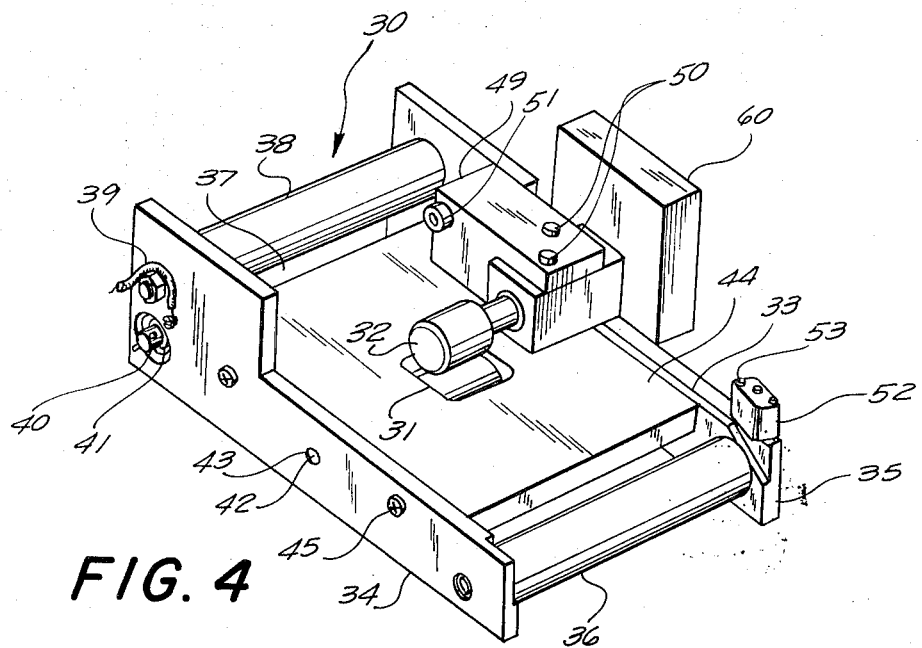

Referring additionally to FIG. 4 of the drawings in loading the film through the metering assembly rollers 31 and 32, care must be taken to carefully slide the film between the guide slots 33 provided in the sides of the film metering sidewall plates 34 and 35 which in turn are mounted within and attached to the side support plates 23 and 24 in any well known conventional matter. The metering station assembly 30 further comprises the film guide and support roller 36 which together with the driven roller 36 serves to support the film as it passes through the metering rollers 31 and 32. The film drive roller pair comprising the driven roller 37 and the pinch roller 38 serve to pull the film from the copy film roll 20 and push it across the master holder 80, the latter being described in detail below. The film drive roller pair 37 and 38 are urged into frictional contact with each other by virtue of the resilient spring means 39 (other side not shown) as is conventional in the art. The driven roller 37 is provided with the film drive shaft 40 which projects through the bearing 41 mounted in the metering station side support plate 34. Suitable roller drive means (not shown), such as an electric motor operator clutch-brake assembly, connected to the extended shaft portion 40 of the roller 37, is provided for driving the film drive roller pair 37 and 38. The idler roller 31 is also rotatably mounted between the side support plates 34 and 35, its support shaft 42 being journaled therein at 43 (other side not sown). The side support plates 34 and 35 are held in an operable spaced apart relationship by virtue of the support plate 44 which is bolted between the members by the bolts 45.

Figure 5:
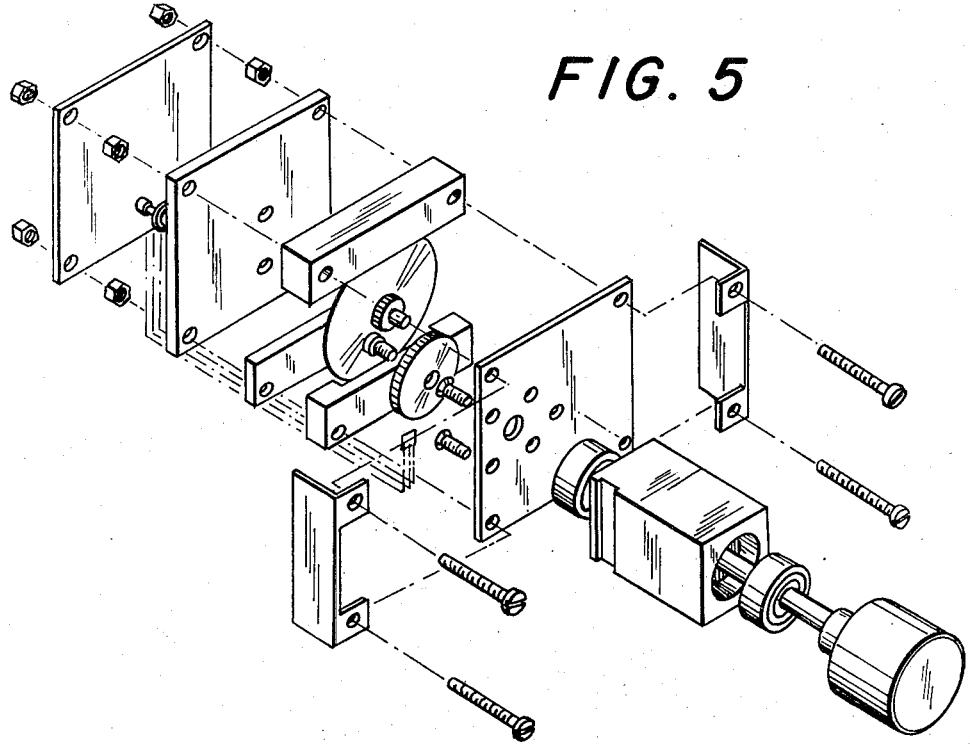

Referring to FIGS. 4 and 5 of the drawings, the metering station assembly 30 also further comprises the metering roller support block 46 which is bored to receive the ball bearing 47 in which the roller shaft 48 is rotatably mounted. The bearing support block 46 is mounted upon and affixed to the support member 49 by virtue of the bolts 50, the member 49 in turn being affixed to the side support plate 45 by virtue of the bolt 51.

The metering means 60 is provided as shown in FIGS. 4 and 5 of the drawings for counting the number or parts of revolutions of the metering roller 32. As shown in particular detail in FIG. 5, the roller 32 is attached to the shaft 48 which in turn is attached to the spur gear 61. The slotted disc or encoder 62 is provided with the gear portion 63 which in turn is adapted to mate with the teeth provided on the shaft gear 61. The slotted disc 62 is rotatably mounted within the housing of the metering means 60 which comprises the front support plate 64, lower spacer blocks 65 and 66, upper spacer block 67, middle support plate 68, and the rear support plate 69. The latter members are sandwiched together and held in position by virtue of the thread and bolt assembly 70, operably mounted between the plates 68 and 69 is the light bulb 71 which in turn is illuminated via the electrical circuit for the present machine. The photo sensitive transitor 72 is provided in line with the slide 73 in the disc 62 and the aperture 74 provided in the spacer plate 68 whereby the bulb 71 can project light through the aperture or opening 74 and through the disc slide 73 to the photosensitive transistor 72 mounted in line opposite the bulb 71.

The dimensions of the metering components shown in FIG. 5 of the drawings are determined by the length of the particular photographic film master being copied. Standard fiche length is approximately 5.8828 inches for which the various metering components can be sized as follows. The roller 32 is made 1 inch in diameter, whereby the circumference is equal to 3.1416 inches. The gears 61 and 63 are sized to provide a ratio of 40 to 18, i.e., a ratio of 2.222. The slotted disc 62 is provided with one slot per degree, i.e., 360 slots. As the film passes between the idler roller 31 and the metering roller 32, the latter in turn rotates the disc slots 73 through the rays of light projected by the bulb 71 through the aperture 74 and through the slit opening 73 to the photosensitive transistor 72 positioned in line opposite the bulb 71. As the slotted disc rotates through the light path which upon being interrupted produces a pulse in a circuit of the photosensitive transistor 72 in a manner well known in the art, the individual pulses are counted. One rotation of the roller 32 projected through the ratio of the gears 61 and 63 to the disc 62, rotates 800 of the slots 73 pass the bulb 71, i.e., 800 pulses per revolution. The number of cycles which must be counted before interrupting operation of the film drive roller pin 37 and 38 to interrupt metering of the film, is accordingly, calculated by multiplying the film length times the gear ratio times the number of disc slots and dividing that product by the circumference of the roller. Based upon the above parameters, 1,480 pulses would be required from the time a film metering command signal was given to the film drive assembly whereby it would be engaged and thereafter disengaged upon the film having been metered to the proper length.

Figure 6:
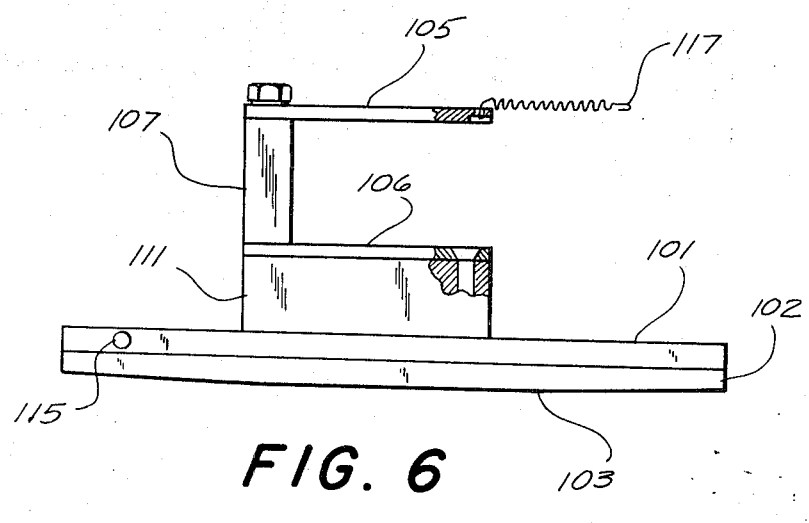

After a vesicular copy film has been metered to the proper length, the film passes into the master holder station 80. In such position, the platen assembly 100 then rotates to press the copy film against the master. Referring to FIG. 3 and more particularly FIG. 6 of the drawings, the pressure platen 100 consists of the pressure plate 101 which is provided with the molded foam silicone rubber platen 102. The platen surface area 103 preferably defines a concave curvalinear surface of approximately a 68 inch radius to assure that all of the air between the copy film and the master copy is pressed out, starting at the middle to outside edges. However, the surface 103 can be flat. The pressure forcing function is applied through the platen cam 104 as shown in FIG. 3 to the platen wear plates 105 and 106 shown in FIG. 6. If the platen 101 is in the up position, the cam 104 rotates against the bottom wear plate 106 to drive the platen 101 down. Conversely, if the platen 101 is in the down position, then the cam 104 rotates against the upper wear plate 105 to drive the platen 101 up. The two wear plates 105 and 106 are connected by the spacer member 107, which members together are bolted to the platen 101 by virtue of the bolts 108 and 109 which extend through the yoke base member 111 into the pressure platen 101 which is bored to receive the same. The yoke base member 111 is further affixed to the pressure platen 101 by virtue of the counter-sunk screws 112 and 113 which also serve to bolt the bottom wear plate 106 to the yoke member 111, extending downward through the said members into the pressure 101 which is bored to receive the same.

Figure 7:
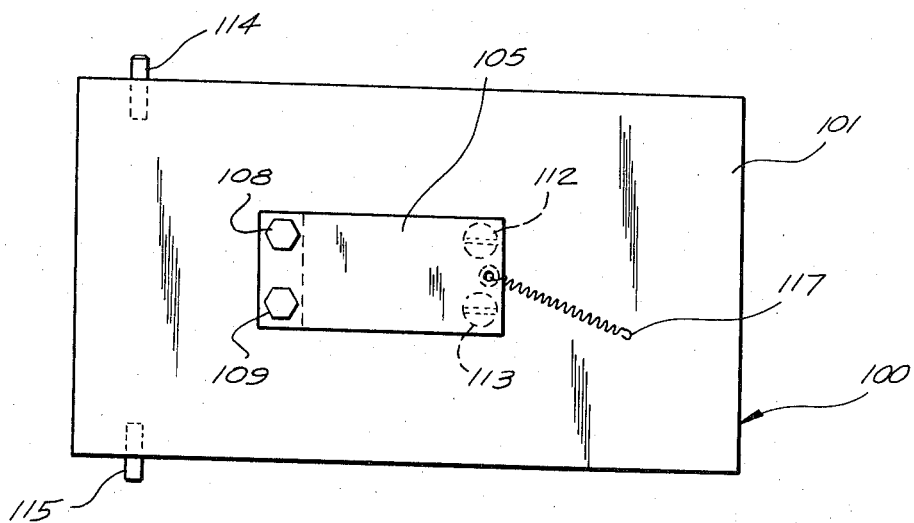

The pressure platen 101 is guided in its vertical motion by the dowel pins 114 and 115, (see FIG. 7), which ride in the plastic tracks 116 as shown in FIG. 3 (opposite track not shown). The platen spring 117 serves to keep the entire platen assembly 100 rotated such that the end of the platen furthest from the cutting assembly 120 presses the film first and then rotates into the pressure state toward the cutter 120.

The platen cam 104 is operably mounted upon the shaft 118 as shown in FIG. 3, the shaft 118 being rotatably mounted between the side support plates 23 and 24 by virtue of the ball bearing means 119 (opposite side not shown) and driven by suitable means, for example an electric motor, off of a central chain drive of the entire machine, or the like (not shown).

Figure 8:
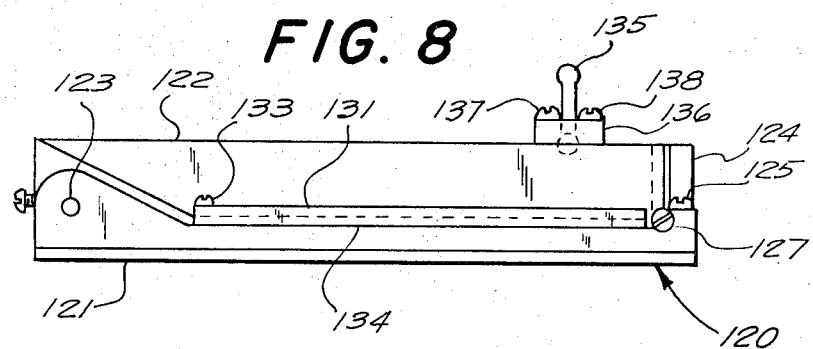
Figure 9:
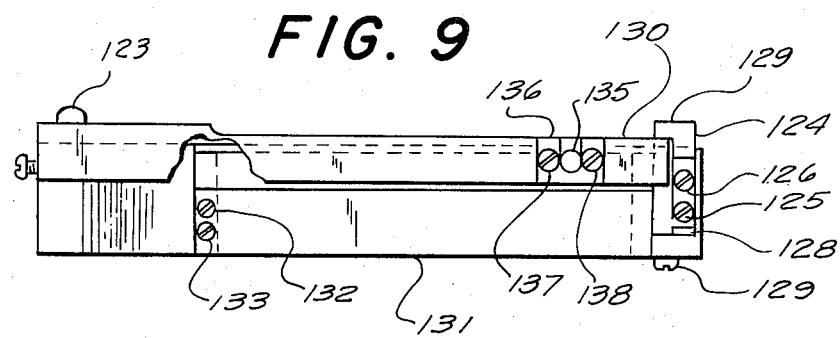

The cutter assembly 120 as shown in FIGS. 8 and 9 cuts the copy film during the platen 100 down cycle. The far end of the fiche is captured and held by the platen 101 as the cutter blades 121 and 122 slice the copy film. The cutter assembly 120 comprises the fixed lower blade 121 and the pivoting upper blade 122. The upper blade 121 is pivoted at one end by the shoulder bolt 123 which connects the two blades. The L shaped blade guide 124 which is affixed to the bottom blade 121 by virtue of the bolts 125 and 126, serves to prevent the upper blade 122 from being shoved backwards out of alignment as it reciprocates downward in the course of cutting the copy film. This structural arrangement is especially desirable when cutting a photographic film having a very tenacious base material, such as polyethylene terephthalate. The blade guide 124 directs only the vertical component of force to the blade 122 during both the cutting and return cycle. The blade guide 124 is threadably bored to receive the adjusting screw 127 which extends through the bottom blade 122 whereby rotation of the screw 127 will allow the relative lateral position between the lower blade 121 and the blade guide 124 to be varied, viz., the gap 128 shown in the cutter plan view of FIG. 9 to be adjusted. In such manner, the extended portion 129 of the blade guide 124 can be made to bear upon the back surface 130 of the upper blade 122, see FIG. 9, such that the upper blade 122 will be laterally confined during its reciprocation.

The lower blade 121 is provided with the film guide member 131 which is an elongated U-shaped member bolted at one of its end to the lower blade 121 by virtue of the screws 132 and 133. The film guide 131 defines the slot 134 into which the copy film passes and is confined during downward travel of the upper blade 122 in the process of cutting the film. The cutter assembly 120 which is positioned between the metering station 30 and the master holder station 80 as shown in FIG. 1 and FIG. 3, the latter view depicting it in an isometric exploded view, is actuated by cam action upon a signal generated by the metering means 60 of the metering station assembly 30.

Before any of the above described detailed operation takes place, the operator will have first placed a master fiche in the master holder 80 so that the master will be in position ready to receive the metered and cut film which is pressed down into juxtaposition over the master. This is accomplished by the operator laterally withdrawing the master holder assembly 80 as shown in the exterior view of FIG. 2 and the specific structural details of FIG. 10 in the drawings. As shown therein, the master assembly 80 comprises the glass exposure plane 81 upon which the master fiche to be copied is positioned. The glass platform 81 is mounted within the master holder frame assembly comprising the elongated side rails 82 and 83 which are held together in a spaced apart relationship by virtue of the connecting rails 84 and 85 which also serve to support the glass member 81 as shown in FIGS. 11 and 12 and in the manner described below. The side rails 82 and 83 are provided with the slide rails 86 (opposite side not shown) which correspondingly fit within and mate with the master holder assembly support guide 87 and 88 shown in FIG. 2. This structural relationship allows the master holder assembly 80 of FIG. 10 to be laterally positioned in and out of the present duplicator means. The handle member 89, suitably attached to the side rails 82 and 83, is provided for gripping the master holder assembly 80 in its operation.

In handling cut photographic film which is placed in contact with other film, it is sometimes difficult to separate the film pieces, in the light of which problem the present film holder assembly 80 includes a vacuum hold down feature to avoid the problem of the master being transported through the present duplicator means along with the copy film after its exposure. Accordingly, a master holder platform is provided by the interface of the master holder main frame comprising the elements 82, 83, 84, and 85, and the glass exposure plate 81. Referring to FIG. 11 which is an elevation view taken along the line A—A of FIG. 10, the glass platform 81 is suspended within the groove 90 provided in the connecting rails 84 and 85, FIG. 11 illustrating such only with respect to the rail 84. The resilient O-ring member 91 is provided for forming a seal between the rail 84 and the glass 89. The glass 81 is firmly attached to the rail 84 by virtue of a hard setting gasket material 92 applied in the annulus remaining above the O-ring 91. The rail 84 is also provided with the groove 83 which extends along its longitudinal axis for the reasons described below.

The plate 81 is similarly connected to the side rails 82 and 83 as shown in FIG. 12 of the drawing which represents a side elevation sectional view taken along the line B—B of FIG. 10. The side rail 83 is provided with the groove 94 which is sealed along its bottom by virtue of the O-ring 95 wedged inbetween the rail 83 and the glass 81. The groove 94 is sealed at its top by the application of a hard setting material whereby the rail 83 and the glass 81 firmly attached to each other. The annulus space 96 is left between the rail 83 and the glass 81 and extends the entire width of the rail 83 and is in open communication with the slot 91 provided in the cross rails 84 and 85. The slot 93 provided in the cross rail 84 is in open communication with the hose fittings 97 and 98 which in turn are connected to a vacuum (not shown). In such manner, when the master copy film is placed on the glass platform 81 and a source of vacuum applied at the hose fittings 97 and 98, the vacuum will pull the master fiche to the platform 81 solidly. With the master fiche held firmly in place by the vacuum, the master holder is now in an operable condition whereby the master fiche is held down in a firm position and cannot be picked up with the exposed copy film due to electrostatic forces, or the like, and transported into the machine. Various improvements can be added to the master holder such as switch means for automatically actuating the vacuum source upon pushing the master holder assembly 80 into the machine. Additionally, master holder ejecting means can be provided such that when the copy cycle is complete, the master holder will be automatically ejected.

Figure 13A:
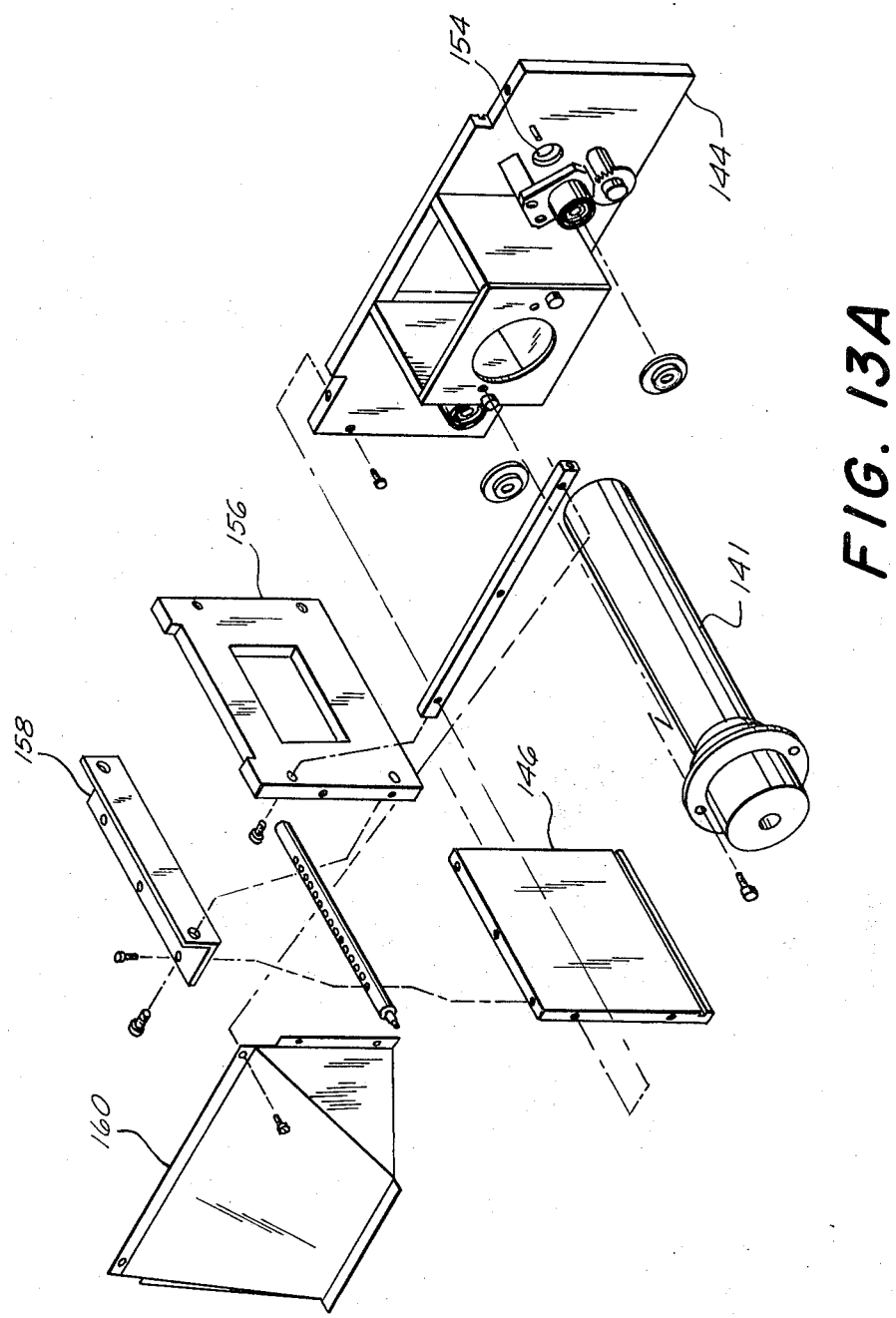
Figure 13B:
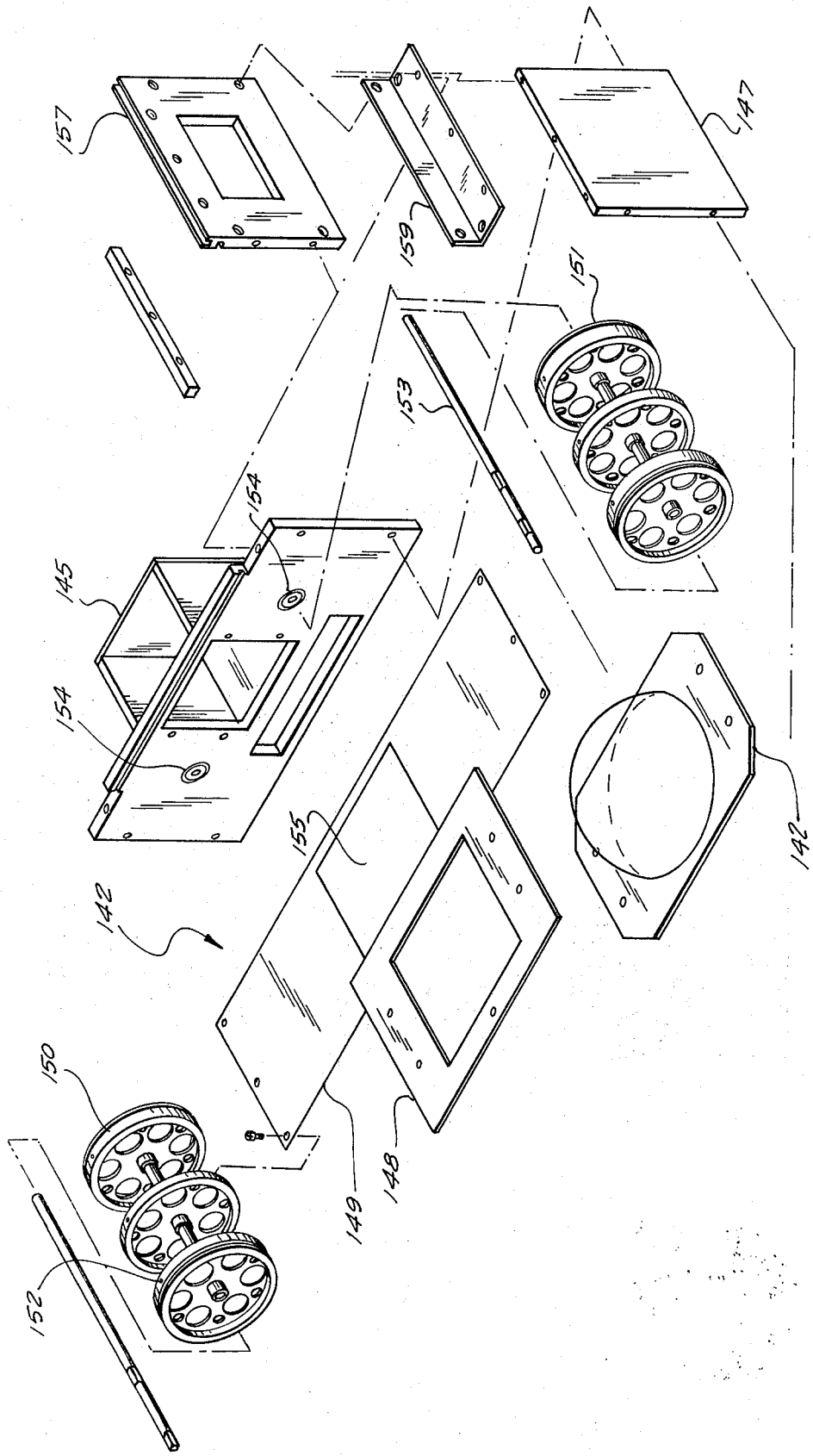

After the copy film has been metered, cut and pressed in juxtaposition upon the master holder 80 by the platen 100, the shutter assembly 140 is actuated whereby the copy film is subjected to high intensity ultra-violet light and thereby exposed to duplicate therein the image of the master. Referring to FIG. 13 in the drawings, the shutter assembly 140 basically comprises the mercury vapor lamp 141, the collumination lens 142 and the focal plane shutter 143. The latter further comprises a lens chamber defined by the rear plate assembly 144 and the front plate assembly 145 which together with the end plates 146 and 147, are fastened together by suitable means. The aperture plate 148 is mounted on top of the former elements to thereby define a lens chamber. The collumination lens 142 is in turn mounted atop the aperture plate 148. The focal plane shutter 149 is operably attached to the drum assemblies 150 and 151. The shutter drums 150 and 151 are mounted upon and fixed to their respective support shafts 152 and 153. The latter shutter drum shafts are rotatably mounted between the rear and front plate assemblies 144 and 145, the latter being provided with the bushings or ball bearings 154 wherein the respective shutter drum shafts are journaled to allow the local plane shutter 149 attached to the counter rotating drum and shaft assemblies 150 and 151 to reciprocate the focal plane shutter 149 in and out of position. This kind of rotating relationship is achieved by conventional clutch-brake control mechanisms (not shown) attached to each of the drum assemblies 150 and 151. The shutter drum assembly 150 is made to operate clockwise and the shutter drum assembly 151 counter clockwise. By such design, when the clutch on the clockwise rotating shaft 152 energizes and the clutch on the counter clockwise rotating shaft 153 de-energizes, simultaneously, both breaks release allowing the shutter aperture 155 to rotate clockwise. When the aperture 155 reaches the center, or open, position, a center switch (not shown) sends a stop command to the clockwise rotating shaft 152. The clockwise clutch then releases, the brakes are applied, and the shutter 149 stops in the open aperture position for a time period determined by the exposure control 14 on the control panel 12. Upon completion of the exposure timing cycle, the brakes release and the clockwise clutch engages driving the shutter to clockwise close position. The next exposure cycle employs the counter clockwise clutch, the same center switch, and brake control, however, moving the focal plane shutter 149 in the counter clockwise direction.

The mercury arc lamp 141 projects terough the rear shutter plate assembly 144 directly under the lens 142 and parallel to the two shutter drum shaft 152 and 143. Accordingly, when the focal plane shutter 149 stops in the center position for its exposure duration in the manner as described above, light from the lamp 41 passes through the aperture 155 to the collumninating lens 142. The collimating lens 141 is a concave/convex, or complex lens which collimates the like to the master holder assembly 80. Such collimation is a key to high resolution contact printing.

The lens 142 fits within a chamber defined by the lens chamber side plates 156 and 157 which are affixed to and positioned atop the front and rear plate assemblies 144 and 145 by virtue of the angle brackets 158 and 159 suitably affixed to each member. The duct 160 which is attached to the lens chamber side plates 156 and 157, is provided for directing a source of cooling air through the shutter chamber for cooling the mercury arc lamp 141 housed therein. A similar air duct (not shown) is positioned on the rear of the shutter assembly.

After exposure of the vesicular copy film in the master holding station 80, the copy retrieval carriage 170 is actuated whereby it moves forward toward the master holder station 80. Referring to FIG. 14 in the drawings, as the copy retrieval carriage 170 reaches a position whereby the pick-up arm 171 extends over and slightly touches the exposed vesicular film, a vacuum source connected to the member causes the copy film to be lifted up and held by that member. This is accomplished by virtue of the fact that the pick-up arm member 171 is provided with the aperture 172 which extends the length of the member 171 and exits on the bottom portion of the laterally enlarged portion 173, the aperture 172 being in open communication with the vacuum source connected to the hose connector 174 which in turn connects to the manifold block 175 which bolts to the pick-up arm 171 by virtue of the bolt 176. The enlarged portion 173 of the pick-up arm 171 is provided with the soft resilient material 177, such as silicone rubber, positioned on its bottom surface so as to prevent scratching of the exposed vesicular copy film.

The pick-up arm 171 is connected to the carriage 178 by virtue of the mounting bracket 179 which is bolted to the bottom portion of the carriage 178 by the screws 180 and 181, the pickup member 171 being pivotally attached to the mounting bracket 171 by virtue of the pin 183 which passes through the aperture 184 of the mounting bracket 179 and the aperture 185 of the pickup member 171. In such fashion, the pick-up arm 171 is allowed to reciprocate in a vertical direction about the longitudinal axis of the pin 183. This relative free-play between the pick-up arm 171 and the carriage 178 allows the pick-up arm 171 to be accurately positioned above the copy film by virtue of the set screw 186 which is threadably mounted in the rear wall of the bracket 179 in line with the rear vertical surface 187 of the pick-up member 171 whereby the elevation of the extended head portion 173 of the pick-up arm 171 can be adjusted by the application of pressure applied to its rear surface 187 through manipulation of the set screw 186 causing the pick-up arm 171 to rotate about the pin 183.

The carriage 178 is provided with the extended lateral portions 188 which are adapted to fit within the elongated grooved guide members 199 as shown in FIG. 3 (opposite side not shown). The grooved member 199 serves to support and define the horizontal path of travel of the copy retrieval carriage assembly 170. The carriage 178 is caused to reciprocate back and forth within the guides 199 by suitable power means, e.g., a motor driven cam assembly operably connected to the actuator arm 189 which in turn is connected to the carriage 178 by virtue of the delrin angle support member 190 and the carriage override connector means 191. The member 190 is bolted to the top center portion of the carriage 178 by virtue of the bolt 192. The vertical leg portion of the angle member 190 is bored to receive the extended portion 193 of the connector 191 whereby it will fit and slide within the aperture 194, being retained therein by virtue of the screw 195. The spring means 196 is provided for urging the connector 191 away from the angle member 190. This relationship provides means for absorbing the impact which occurs when the carriage arms 188 reachs the end of the slot in which it travels in the guide 199 whereby smoothness of operation is realized and damage between the elements avoided. The connector 191 is connected to the actuating arm 189 by the bolt 197, the arm 189 being provided with the bore hole 198 through which the bolt 197 bayonets and screws into the carriage override connector 191 which is threadably bored at 199 to receive the same. This relationship allows the arm 189 to reciprocate relative to the connector 191. The arm 189 is connected to suitable actuating means (not shown) capable of reciprocating the arm 189 in a lateral direction so as to slide the pick-up arm backwards and forwards over the path of travel defined by the guides 199. Such means can comprise electric motor driven cam means, spring loaded solenoid means, or the like.

The kickup block 200 is provided for the reasons discussed below. The block is bolted to the carriage 178 by the bolts 201 and 202. The block 200 is also provided with the inclined surface 203, the function of which is also described below.

After the exposed vesicular copy film is picked up by the pick-up arm 170 the latter member slides backward away from the master holder station 80 and deposits the copy film on the conveyor 210, as shown in detail in FIG. 15. The conveyor assembly 210 then transfers the copy film to the 120 degree transition guide 250. The conveyor assembly 210 comprises the idler roller 211, the top roller 212, and the driven roller 213, the latter being attached to suitable driving means, such as an electric motor, central chain drive, or the like (not shown), at one of its extended shaft portions, e.g., at its extended shaft portion 215 by coupling means (not shown) fastened thereto by virtue of the roll pin 216 which bayonets through the aperture 217 provided in the shaft extension 215. The rollers 211, 212, and 213, as well as the resilient belt 214, are bracketed by the side plates 218 and 219 which are held together in a fixed spaced apart relationship by virtue of the spacer sideplate guide 220 bolted together by the screws 221. Attached to the sideplates 218 and 219, are the film guides 222 and 223 which guide the film across the conveyor assembly 210. The roller 211 is rotatably mounted in the bushings 224, the roller 213 by the bushings 225, and the roller 212 by the bushings 226, the sideplates 218 and 219 being suitably bored to receive the respective rollers. In the case of the top or pinch roller 212, the sideplates are provided with the elongated slots 227 oriented in a vertical direction whereby the bushings 226 are allowed to slide vertically therein. This allows the pinch roller 212 to be pulled down into tight frictional contact with the belt 214 which is thereby wedged between the rollers and accordingly forced to rotate over the rollers 213 and 211. This is accomplished by virtue of the resilient spring means 228 attached to the sideplates 218 and 219 by the pair of screws 229, the respective sideplates being threadably bored to receive same.

As the exposed copy film is deposited on the conveyor belt 214 the roller assembly 230 swings down on the copy film. The roller assembly 230 comprises the roller 231 and roller arm 232, the roller 232 being rotatably attached to the roller arm 232 by virtue of the shoulder bolt 233. The roll arm 232 is spring loaded by virtue of the torsion springs 234 mounted on the kick-up shaft 235 to which the roller arm 232 is rigidly affixed by virtue of the screw 236 to thereby prevent relative rotation between the roller arm 232 and its support shaft 235. The kick-up shaft 235 in turn is rotatably mounted upon the mounting block 237, the latter being provided with the aperture 238 into which the shaft 235 bayonets and is retained therein by virtue of the retaining ring 239. The support 237 is bolted to the side support plate 218 by virtue of the screw pair 240.

The kick-up roller arm block 200 attached to the pick-up arm assembly 170 shown in FIG. 14, lifts the roller assembly 230 up and out of the way during the pick-up arm 170 forward cycle. Conversely, as the pick-up arm assembly 170 reaches the rear rest position and drops the copy film, the roller 231 drops and presses the copy film against the conveyor belt 214.

Figure 16:
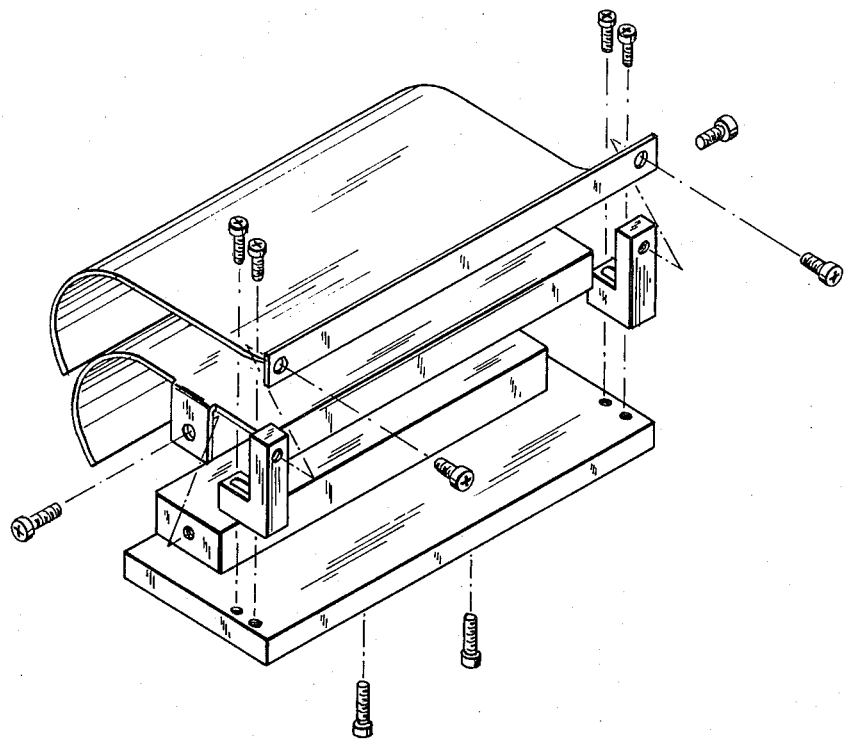

The 120° transition assembly 250 as shown in FIG. 16 provides the interface between the conveyor assembly 210 and the developer assembly 260. The transition guide 250 changes the film flow direction through an angle of 120°. The fiche copy is pushed into the transition by the conveyor drive roller pair 212 and 213 of FIG. 15. The transition guides the fiche and supports the fiche in the center. The leading edge of the fiche enters the developer assembly 270 as it exits the 120° transition. The copy fiche is under positive control throughout the transition period, since it is pushed in, captured, and pulled out by the developer 270.

Figure 17:
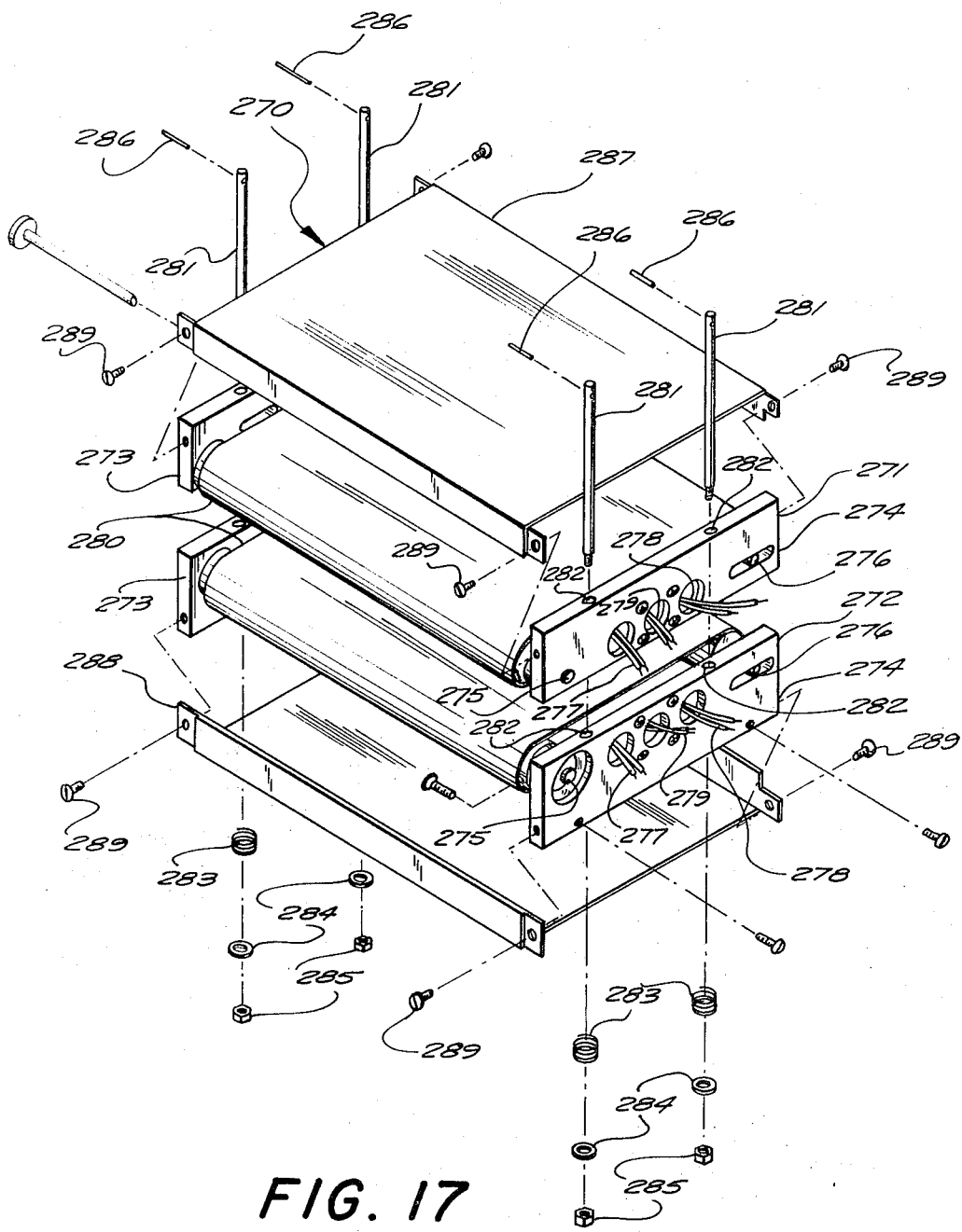

The transition assembly 250 comprises the top film guide 251 and the bottom film guide 252 which are curved essentially the same through the angular deflection of 120° with respect to the horizontal plane in which the film is traveling which is accordingly deflected downwards from the horizontal plane into the developer 270. The guide 251 and 252 are mounted upon and attached to the base member 253. The guide 252 is attached to the spacer 254 which is bolted to the base member 253 by virtue of the screw pair 255, the bottom guide 252 in turn being bolted to the spacer 254 by the screw 256, the guide 252 being provided with the downward extended portion 257 bored to receive the screw 256. The top guide 251 is provided with the extended portion 258 extending along its width and bored to received the screws 259 which fasten the guide 251 to the L-shaped top support members 260 which in turn are affixed to the base member 253 by the screw pair 261, the base 253 being threadably bored to receive the same. The developer assembly 270, which receives the exposed copy film from the 120° transition guide means for its development, is a standard calord belt heater with a thermo-switch control (not shown) to operate at a nominal temperature of 260°F. Referring to FIG. 17 in the drawings, the developer assembly 270 consists of an upper developer assembly 271 and lower developer 272. Each develop assembly comprises the endplates 273 and 274 which bracket in the idler rolls 275 and the adjustable roller 276. Each of the roller 275 and 276 are journaled in the endplates 273 and 274 in the conventional fashion similar to the structure of the conveyor assembly 210 described above. Each of the assembly's 271 and 272 is provided with 2 calrod heating elements 277 and 278. The latter elements are recessed in a heater bar assembly (not shown) with the thermo-switch 279 mounted in a bar assembly (not shown) between the heaters 277 and 278. The heater bar and rollers 275 and 276 are mounted within the silicone rubber belt 280. The upper end lower developer assembly's 271 and 272 mate via their respective end plate 274 and the connector pin 281 which bayonets through the bore holes 282 provided in the end plates 274 to thereby sandwich the upper and lower development assemblies together. The connector pins 281 are threaded on the bottom and extend through the resilient spring means 283, through the retainer washer 284 and thread into the nut 285. The pins 281 are provided with the retaining roll pins 286 which extend through their top portion which thereby prevents the pins 281 from passing through the apertures 282 such that the resilient spring means 283 will as a result of such structure urge the developer assemblies 271 and 272 toward each other at all times. This relationship insures maximum and even heat transfer to the vesicular copy film being developed by the developer assembly 270. The upper developer assembly 271 constitutes an idler roller assembly and the lower developer assembly 272 constitutes the driving roller assembly with the only difference between the two being due to the fact that the roller 275 has an extended shaft portion which extends through the end plate 274 for connection to suitable means for driving the roller 275, e.g., a main drive chain assembly, or the like (not shown). The overall developer assembly includes the asbestos covered sheet metal air shields 287 and 288 which are attached to the respective side plates of the upper and lower developer assemblies by the screws 289.

Figure 18:
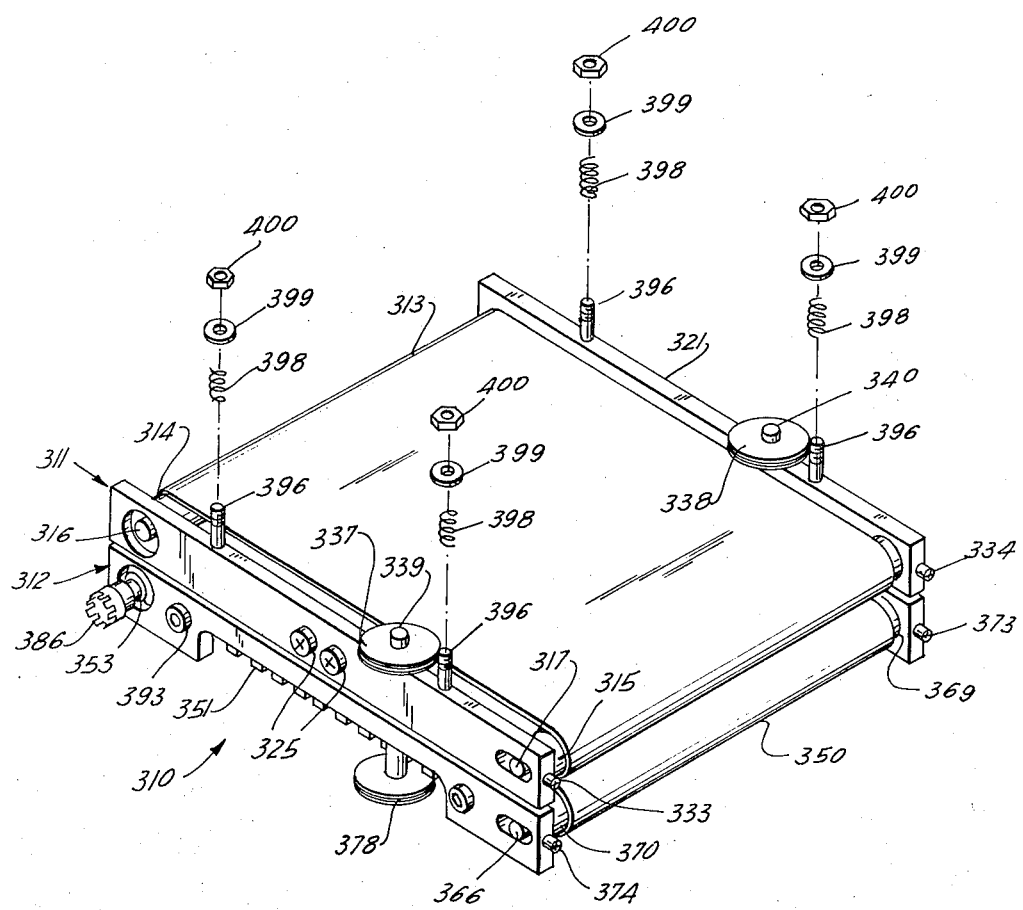

Referring to FIG. 18 in the drawings, the present decurling device or chill station assembly 310 comprises the top plate 311 and bottom plate 12 assemblies. The top plate assembly 311, as shown in greater detail in the drawings in FIG. 19, in essence, constitutes an idler belt stretched between two idler roller. Specifically, the belt 313 is an endless pliable belt mounted upon and stretched between the rollers 314 and 315. The roller 314 is further defined as including the shaft 316. The roller 314 preferably comprises a hard rubber member bored to receive the metal shaft 316. The extended end portions of the shaft 316 of the roller 314 are adapted to slidably and rotatably fit within the bushing or bearing members 318 and 319 which in turn are adapted for mounted in the supporting side plate members 320 and 321. The latter are bored to receive the respective bearings 318 and 319, interference between the members being such that the bearings 318 and 319 will not rotate within the respective bore holes 322 and 323 in the support plates 320 and 321. The side plates 320 and 321 are mounted in a fixed spaced apart relationship by virtue of the brace member 320 which is rigidly connected to the side plates 320 and 321 by virtue of the respective pair of screws 320 and 326.

The front roller 315 comprises a cylindrical hollow tubular member which is adapted at each of its ends to snugly receive the bearing members 327 and 328, the latter in turn being bored to receive and rotate upon the shaft 317. The bearing or bushing members 327 and 328 includes an extended portion which bayonets within each respective open end of the hollow roller 315 such that the shaft 317 is concentrically mounted within and upon which the roller assembly 315 rotates.

The side plates 320 and 321 are provided with the elongated holes or slots 329 and 330 of a thickness sufficient to admit the ends of the shaft 317 whereby the latter can be laterally shifted within the elongated slots 329 and 330 over a distance suffficient to remove slack from the pliable belt 313, or convirtue of the shaft 317 being provided with the bored holes 331 and 332 such that upon rotation of the respective screws 333 and 334 which, as shown in FIG. 18, when extended through the holes 335 and 336 provided in the end of the respective side plates 320 and 321 in open communication with the slots 329 and 330, and fitted in the respective threaded holes 331 and 332 of the shaft 317, serve as a means of adjusting the lateral position of the shaft 317, or roller assembly 315, relative to the opposing roller 314. In such fashion, the tension in the rubber or similar pliable material belt 313 can be readily adjusted.

The belt 313 is constantly centered on the rollers 314 and 315 by virtue of the idler 337 and 338, as specifically shown in FIG. 18 of the drawings. The idler disc 337 and 338 are mounted upon the respective side support members 320 and 321 which are threadably bored to receive the respective screws 339 and 340. The idler disc 337 and 338 are also bored to receive the screws 339 and 340. The spacer members 341 and 342 are provided for positioning the respective idler disc 337 and 338 at a fixed spaced apart relationship from its respective side support plate depending upon the position of the belt edge as a factor of the overall dimensions of the roller diameters and width of the side support plate.

The bottom plate assembly 312 is similar in most respects to the top plate assembly 311 except for the fact that the belt member 350 is the driven belt and that the manual 351 is provided, being positioned within the interior of the belt. The roller 352 is similar to the roller 314, being provided with the shaft 353 and also preferably being of a soft resilient material to provide frictional contact between the inside surface of the belt 350 and the peripheral surface of the roller 352. The bearings 355 and 356 are bored to receive the respective end portions of the shaft 353 of the roller 352. Likewise, the bottom side support plates 357 and 358 are provided with the bore holes 350 and 360 in which the respective bearings 355 and 356 are snugly fitted to prevent their rotation within.

The side support plates 357 and 358 are held apart in a fixed spaced apart relationship by virtue of the runners or braces 360 and 361, the latter being attached to the side support plates 357 and 358, at each of their ends, by virtue of the screw pairs 360 and 364, the members 360 and 361, as well as the side support plates 357 and 358, being bored to receive the recited screws. The opposite ends of the braces 360 and 361 which are hidden beneath the chill belt 350 are similarly fastened to the side support plate 358.

The roller member 365 is similar to the roller 315 shown in FIG. 19 of the drawings. It likewise comprises a tubular member which is concentrically spaced over the shaft 366 which is provided with the threaded holes 367 and 368 at the end portions thereof. The bushings 369 and 370 are bored to receive the end portions of the shaft 366 which rotates therein, the bushings being provided with an extended portion having a diameter essentially equal to the inside diameter of the roller 365 wherein they bayonet with sufficient interference such that they will not rotate independently of the roller tube 365 and consequently, forms a roller assembly which rotates as a unit around the shaft 366.

The side support plates 357 and 358 are provided with the elongated slots 371 and 372 which are bored to receive the end portions of the shaft 366. The holes 371 and 372 are of a length sufficient to allow lateral movement of the shaft 366 whereby the slack, or conversely, the tension in the flexible belt 350 can be adjusted. This is accomplished by virtue of the adjustment screws 373 and 374 which bayonet through the holes 375 and 376 respectively of the side support plates 358 and 357, and upon being threaded into the respective holes 367 and 368 of the shaft 366, allow a lateral adjustment of the shaft 366, as also further shown in FIG. 18.

The belt 50 is constantly centered on the rollers 352 and 365 by virtue of the idler discs 377 and 378. The disc 377 and 378 are rotatably attached to the respective support plates 358 and 357 by virtue of the screws 379 and 380, the discs being bored to receive the screw members 379 and 380 upon which they rotate. The side support plates 358 and 357 are provided with the threaded bore holes 381 and 382 to receive the bolts 379 and 378. The washers 383 and 384 are provided for maintaining the discs 377 and 378 in a fixed spaced apart relationship relative to the side support plates 358 and 357 and are of a length such that the groove provided in the edge of the disc will lie in essentially the same plane as that of the belt whereby the respective edge of the belt 350 will ride in the groove provided in the peripheral edge of the respective disc. The roller 352 is the drive roller for the present device and its extended shaft portion 353 is provided with the key hole 385 to which the coupling member 386 is attached by virtue of the pin 387. The coupling member 386 is attached to some suitable power means, for example, an electric motor or the like (not shown), for driving the drive roller 352.

Figure 21:
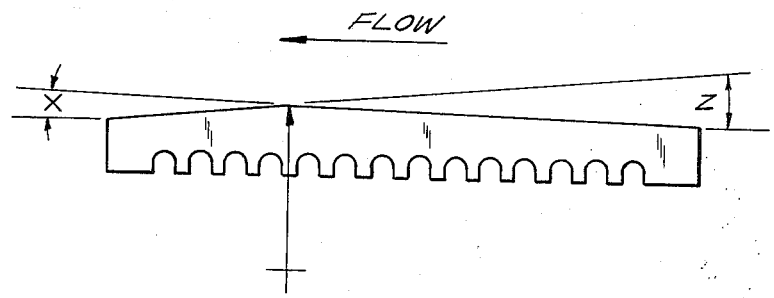

The mandrel 351, which also serves as a heat sink, is positioned within the interior portion of the chiller belt 350 and is mounted relative to the inside surface of the belt whereby the latter is always in contact with the top surface 388 of the mandrel 351. The mandrel or heat sink 351 is provided with a convex smooth surface so as to minimize friction between the inner surface of the belt 350 and the surface 388 of the mandrel 351. The bottom portion of the mandrel 351 is provided with the finned surface interfacing 389 which provides the primary cooling surface of the heat sink mandrel by virtue of air being flowed over the heat sink fins 389. Referring to FIG. 21 in the drawings which depicts and isloated side view of the mandrel 351, the top surface 388 is illustrated as being convex which is its usual shape since most curling problems are concerned with curvature about an axis perpendicular to the machine direction of the coating on a given photographic film. This is especially true encountered in its manufacture and subsequent storage. Additionally, such film is generally rolled with its emulsion side down such that its measurement of curl will be given a positive value for the reasons discussed above. In light of the preferred application of the present method and means, the shape of the surface 388 of the mandrel 351 will be described with reference thereto. However, it is to be understood where curl occurs in the cross machine direction, then the surface 388 will be convex taken with respect to an apex of curvature which runs parallel to the direction of flow indicated in FIG. 18 of the drawings, rather than perpendicular thereto as illustrated in FIG. 21 and which is illustrative of the preferred application of the present invention. Likewise, where the curl has a negative value, the surface 388 of the mandrel 351 would conversely be concave rather than convex as illustrated in FIG. 18.

Conditioned up on the above, and for ease of manufacture, the surface 388 is made essentially flat over the initial one-half portion, gradually elevating at an angle essentially equivalent to the angle of a chord of the arc prescribed by the radius of curvature of the curled film to be decurled. Thus, the points 392, 390, and 391 would lie upon an arcuate path of equal radius, but opposite in direction as that prescribed by the curl of the particular film to be decurled. As brought out above, the embodiment of FIG. 21 is with reference to positive curl in the machine direction. The angle X would represent the angle of inclination of the first chord and the angle Z will represent the angle of declination of the second chord, the angles X and Z, which are preferably equal to each other being defined relative to a straight line connecting the points 391 and 392. The apex portion 390 of the triangle thus defined would be gradually smoothed over such that a film passing over the surface 388 of the mandrel 351 would make a gradual transition from the inclining to the declining path prescribed by the mandrel. Needless to say, the surface 388 of the mandrel 351, can be accurately machined to match the same art presribed by the radius of the curvature of the curled film. However, as brought out above, the design of the surface 388 of the mandrel 351, discussed above, is less expensive to manufacture. Since the only curved portion is that having the large curvature of radius R, as shown in FIG. 21, over the apex 390 of the inscribed triangle lying within the points 390, 391, and 392.

The mandrel or chiller 351 is rigidly mounted within the interior of the belt 350 by virtue of the bolts 393, which bayonet through the boreholes 394 provided in the respective side support plates 357 and 358 and thread into the threaded boreholes 395 provided in the sides of the mandrel 351. In such manner, rigidly affixed to and suspended between the side support plates 357 and 358. The mandrel 351 is positioned there between such that the inner surface of the chill belt 350 is always in contact with its surface 388. As brought out above, the extent of contact between these members is also a factor of the amount of tension placed in the belt 350 by virtue of the adjustment of the screws 373 and 374.

The top plate assembly 311 and the bottom plate assembly 312 are operably connected to each other by virtue of the stud bolts 396, which are rigidly attached to the respective side support plates 357 and 358 by virtue of the threaded boreholes 397 provided therein. The side support plates 320 and 321 of the top plate assembly 311 is provided with the boreholes 398, which are spaced apart on center lines corresponding to the portions of the studs 396, the holes 398 being sufficiently large such that the top plate assembly 311 is allowed to move vertically relative to the bottom plate assembly 312. This relative working relationship between the plate assemblies 311 and 321 is maintained by virtue of the resilient spring means 398, which are mounted upon the studs 396 and which are retained thereon by virtue of the retainer washer 399 and nut 400.

The vesicular copy film after leaving the decurler/chiller station 310, enters the 60° transition station 410 shown in detail in FIG. 21. The transition means 410 comprises the archedplate 411 which is provided with the film guide side plates 412 and 413, these members being bolted together by virtue of the screws 414 and 415, together with the screws 416 which also attach the transition bar 417 to the bottom of the arched plate 411. The support bar 418 which is attached across the top of the film guides 412 and 413 by virtue of the screws 419, is provided for supporting the shoe 420 which is attached to the bar 418 by virtue of the screw 421.

The 60° transition means 410 which provides an interface between the chill station assembly 310 and the clearing station assembly 430, is provided with the sensing switch 422 which in turn provides a slow drive/fast drive function by changing the speed of the input drive roller of the clearing station 430. The microswitch arm 423 projects into the transition. As the microfiche enters the 60° transition 410, the switch 422 is activated. This switch activation provides the necessary information for the speed control of the clearing station roller. The switch 422 is mounted upon the bracket 424 in turn being bolted to be bar 417 by virtue of the screw pair 426.

Figure 22:
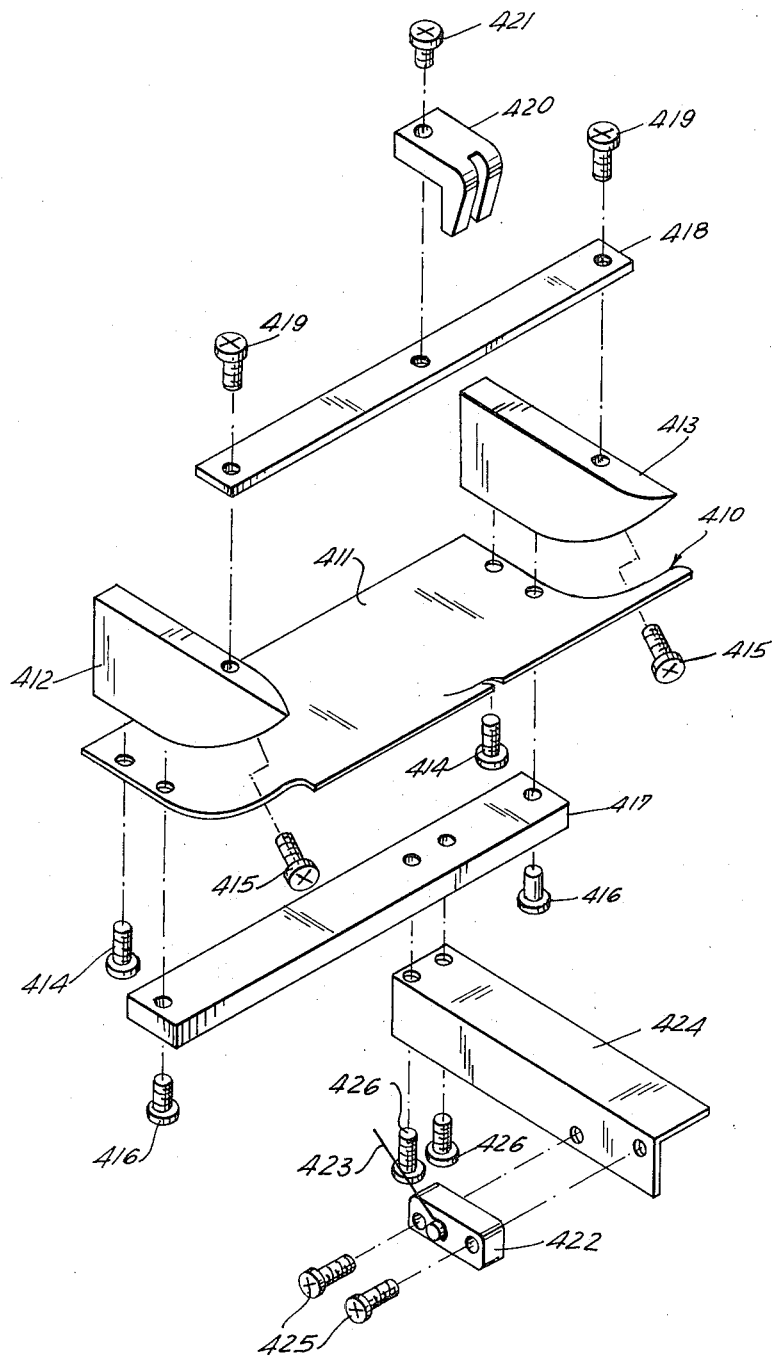
Figure 23:
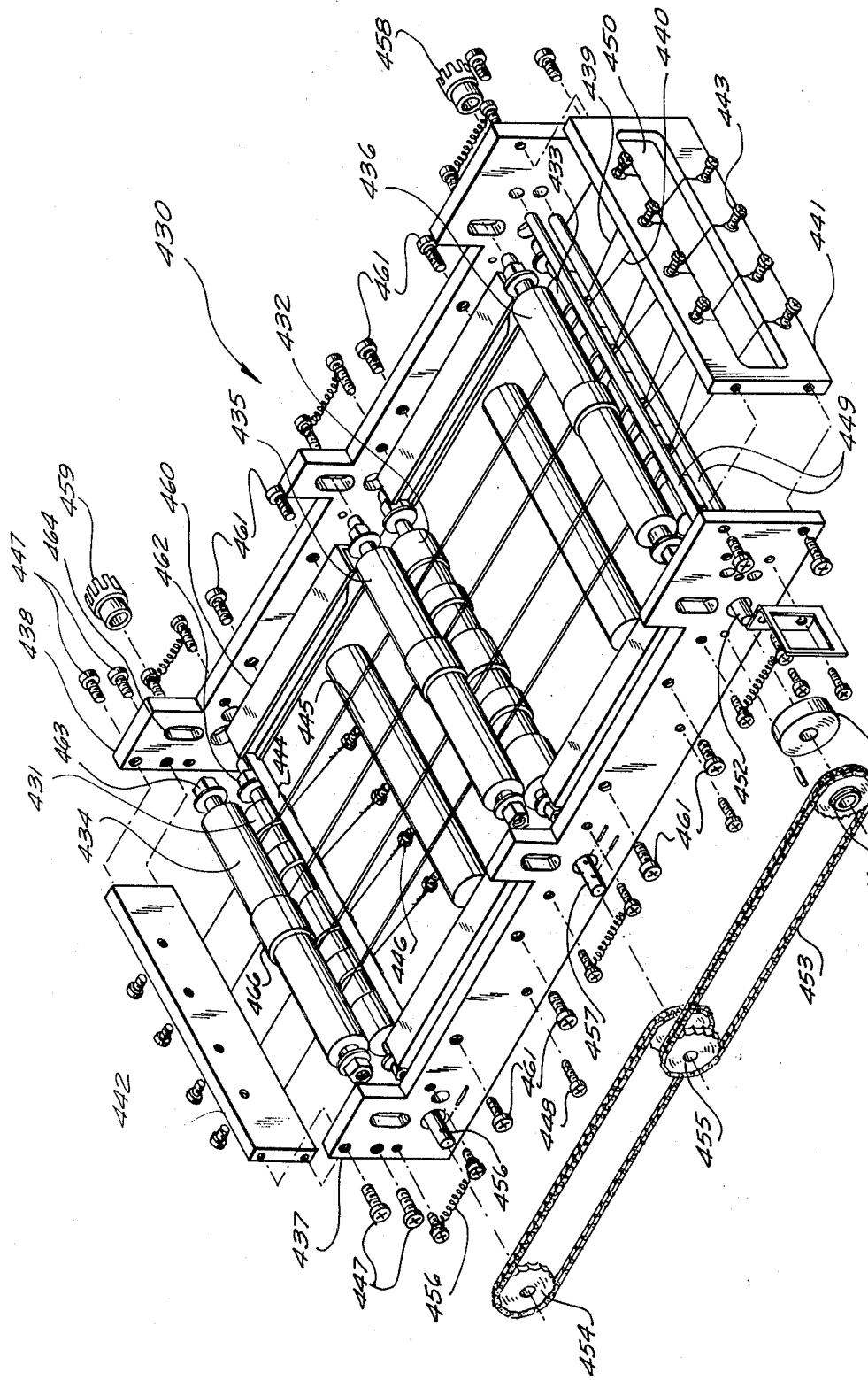

The clearing station assembly 430 as shown in FIG. 22 is the mechanism which passes the developed copy fiche under the lamp 141 for the purpose of clearing or fixing the film. The clearing station 430 is the final assembly in the film flow flow through the present developer means. The clearing station deposits the fiche which passes through it in the stacking tray 500 for removal by the operator. The clearing station assembly 430 is provided with the three driven rollers 431, 432, and 433, each having the respective pinch rollers 434, 435, and 436 associated therewith. All of the rollers are supported by the side plates 437 and 438.

The film is supported in its travels from roller to roller by the four thin guide wires 439 positioned above the film and the four thin guide wires 440 positioned below. The four top wires 439 are stretched from the top of the enter endplate 441 to the exit endplate 442, being attached thereto by virtue of the screws 443. The four bottom guide wires 440 are stretched from the bottom of the enter endplate 441 over the bar member 444 and attached to the spacer 445 by the screws 446. The plates 441 and 442 are attached to the side plates 437 and 438 by the screws 447. The spacers 445 are mounted between the side plates and bolted thereto by virtue of the screws 448, the spacers in turn positioning the side plates 437 and 438 in a fixed spaced apart relationship. The wire supports 449 are provided for positioning the wires 439 and 440 slightly apart to receive the exposed copy film which passes through the opening 450 whereby the copy film is guided into the nip of the rollers 433 and 436. The wire supports 459 are attached to and mounted up on the side plates 437 and 438.

The two rear, or exit, rollers 431 and 432 are driven 2.5 times slower than the main fiche flow through the machine. This allows maximum clearing time before exiting the machine. The ender end drive roller 433 is controllable by two clutches. The slow drive clutch sprocket assembly 451 attached to the shaft 452 is coupled by the chain link 453 to the two rear roller drive sprockets 454 and 455. The latter sprocket are in turn respectively connected to the shafts 456 and 457 of their respective rollers 431 and 432. A second clutch, fast drive (not shown) is attached to the opposite end of the shaft 452, and its sprocket 458, as well as the sprocket 459, is attached to suitable drive means (not shown), such as a main chain drive assembly for the entire machine. The microswitch 422 positioned in the 60° transition means 410 activates the complementary pair of clutches positioned on each end of the shaft 452 of the roller 433. The switch normally closed position activates the slow drive clutch 451 forcing all three rollers, namely 431, 432, and 433, to drive at the same speed. As film enters the 60° transition 410 and activates switch 422, the normally open side is closed, deactivating the slow drive clutch 451 and activating the fast drive clutch (not shown). This causes the enter end roller 433 to be driven 2.5 times faster than the two clearing station rear end rollers 431 and 432. The enter end roller must be accelerated in this manner to accept the fiche and prevent buckling. Since the distance between any two rollers throughout the machine is always less than the shortest length used, the enter end roller is speeded up to standard machine speed during the capture time of the fiche. Once the fiche is under complete control of the clearing station roller, the speed is reduced.

The film guides 460 are provided for building the copy film through the clearing station and are positioned in the same plane established by the wire guides 439 and 440, beng affixed to the side plates 437 and 438 by virtue of the screws 461. The bottom drive rollers, for example, roller 431, is provided with the bushing 462 in which the shaft 456 is rotably supported, the bushing 462 being adapted to fit within and be supported by the side plates 437 and 438. Likewise, the pinch or upper rollers, for example, roller 434, are provided with the bushing members 463 which are adapted to fit and slide within the elongated slot 464 provided in the respective side plates 437 and 438. The pinch rollers are urged downward by the spring and the screw assemblies 465 which bolt to the respective side plates 437 and 438. The spring member of the assembly 465 fits over the top shoulder portion of the bushings 463 so as to urge the respective pinch rollers downward at all times, viz., to cause, for example, the roller 434 to pinch the roller 431. The pinch and the drive rollers are provided with the rubber sleeves 466 whereby the rollers can readily grip the vesicular copy film as it passes there between.

The method of the present invention comprises first metering a given length of unexposed of unexposed vesicular copy film, severing the desired length of copy film, pressing the copy film in juxtaposition with a master film to be copied, exposing the master and the vesicular copy film to a high intensity light source, separating the two films, conveying the exposed vesicular copy film into heater means capable of relaxing the polymeric vehicle thereof whereby the gas realized upon exposure of the gas producing sensitizer compound produces small vesicles therein to define an image corresponding to that of the master dopy, thereafter immediately cooling and decurling the exposed and developed vesicular copy film by simultaneously cooling and passing it through a plane opposite in shape to that of the initial curl of the film, and clearing the exposed and decurled copy film by subjecting it to a high intensity light source to thereby decompose any remaining un-decomposed gas producing sensitizer compound remaining therein.

In light of the foregoing description of the present invention, it will be apparent to one skilled in the art that various changes and modifications in the design and materials of construction of the present invention can be made without departing from the true scope and spirit of the invention. For example, the various recited components need not be housed in a single superstructure, but rather, can be segragated into separate components operably connected, within or without a common housing. Moreover, the various components of the present machine can be electrically actuated or mechanically/electrically actuated utilizing a central chain drive which in turn is driven by an electric motor that is controlled by a central control system which integrates its operation with the other electrical components, such as the clutches, etc., of the present machine in conventional manners well known in the arts. Further, modification in the individual parts of the components can be made without departing from the present invention, for example, different types of high energy radiation or other means of energy can be employed for exposing the film in lieu of the mercury arc lamp described supra.

What we claim is:

1. Microfiche duplicator means comprising:

a. film holder means for supporting a continuous roll of vesicular copy film;
    b. metering means for measuring a predetermined length of copy film;
    c. cutting means for severing the selected length of copy film received from said metering station;
    d. holder means for receiving a master film and the severed length of copy film whereby the master film and the copy film are oriented in juxtaposition;
    e. platen means for pressing the master film and the copy film together while in said latter holder means;
    f. exposure means for exposing the vesicular copy film to a source of high energy radiation to define an abeyant image therein in terms of the image of the master film by the decomposition of the sensitizer compound dispersed in the vehicle of the vesicular copy film;
    g. copy retrieval means defining a pick up arm for removing the exposed vesicular copy film from said holder means;
    h. conveyor means for conveying the exposed copy film from said holder means to developer means;
    i. developer means for conveying and heating the exposed vesicular copy film whereby the abeyant image therein is formed upon the relaxation of the vehicle of the vesicular film;
    j. chilling and de-curling means including cooling means, film forming means, and conveying means for conveying the heated developed copy film through said film forming means while simultaneously subjecting the developed film to the said cooling means; and
    k. clearing means for again subjecting the vesicular film to a source of high energy radiation and thereby decompose any un-decomposed sensitizer remaining in the developed vesicular copy film.

2. The microfiche duplicator means of claim 1 further characterized in that;
    said exposure means is further defined as comprising mercury arc lamp means, shutter means, and lens means.

3. The microfiche duplicator means of claim 1 further characterized as comprising:

l. transition means for receiving the exposed vesicular copy film from said conveyor means and directing the film down to said developer means, said conveyor means being oriented in an essentially horizontal position and said heater means being oriented in a somewhat vertical position;
    m. transition means for receiving the developed copy film from said chiller and de-curler means and deflecting it to said clearance station, said chiller and de-curler means being oriented in a somewhat vertical position and said clearing means being oriented in an essentially horizontal position.

4. A method of producing physically flat vesicular microfiche comprising:

a. metering a selected length of vesicular copy film;
    b. severing the selected length of copy film;
    c. pressing the severed length of copy film in juxtaposition with a master to be copied;
    d. exposing the vesicular film to a source of high energy radiation to decompose the sensitizer compound dispersed in the vehicle of the vesicular copy film to thereby define an abeyant image therein corresponding to that of the master film;
    e. conveying the exposed copy film to heater means;

f. heating the exposed copy film to at least the glass transition temperature of the vehicle of the vesicular copy film whereby it is relaxed and vesicles are formed therein by the gas produced upon the decomposition of the sensitizer compound dispersed therein;

g. deforming the heated developed vesicular film by passing it through a plane opposite in shape to that of the curl imparted to the film, while simultaneously cooling the film to thereby produce a physically flat microfiche film copy; and h. clearing the film by subjecting it to a source of high energy radiation whereby un-decomposed sensitizer compound remaining therein is decomposed.

* * * * *